US006804085B1

United States Patent
Azarian et al.

(10) Patent No.: US 6,804,085 B1
(45) Date of Patent: Oct. 12, 2004

(54) HARD DRIVE SYSTEM INTERFACE BETWEEN A DISK SURFACE AND A TRANSDUCER CONTACTING THE SURFACE DURING COMMUNICATION

(75) Inventors: Michael H. Azarian, Cupertino, CA (US); Michael A. Baldwinson, Cupertino, CA (US); Keith R. Berding, San Jose, CA (US); Kaynam Chun, San Francisco, CA (US); Garrett A. Garrettson, Los Altos Hill, CA (US); Christopher S. Gudeman, Los Gatos, CA (US); Harold J. Hamilton, Santa Clara, CA (US); Anthony A. Jarrami, San Jose, CA (US); Shinichi M. Tanaka, Fremont, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 08/408,036

(22) Filed: Mar. 21, 1995

(51) Int. Cl.$^7$ ............................. G11B 5/82; B05D 5/12
(52) U.S. Cl. .................. 360/135; 428/141; 428/694 SG
(58) Field of Search ................. 360/135; 428/65.3, 428/65.4, 65.5, 141, 694 TR, 694 SG

(56) References Cited

U.S. PATENT DOCUMENTS

| | | | |
|---|---|---|---|
| 4,540,618 A | * 9/1985 | Suzuki et al. ............... 428/141 |
| 4,557,947 A | 12/1985 | Deimling et al. ............ 427/130 |
| 4,939,614 A | 7/1990 | Shirakura et al. ........... 360/135 |
| 4,985,306 A | 1/1991 | Morizane et al. ........... 428/410 |
| 4,997,696 A | * 3/1991 | Kamada et al. ............. 428/141 |
| 5,030,494 A | * 7/1991 | Ahlert et al. .................. 428/64 |
| 5,041,932 A | 8/1991 | Hamilton .................... 360/104 |
| 5,119,258 A | 6/1992 | Tsai et al. .................... 360/135 |
| 5,123,933 A | 6/1992 | Ito et al. ........................ 51/293 |
| 5,139,849 A | * 8/1992 | Takagi et al. ......... 428/694 SG |
| 5,160,761 A | 11/1992 | Koga et al. ................. 427/548 |
| 5,166,006 A | 11/1992 | Lal et al. ..................... 428/612 |
| 5,167,096 A | 12/1992 | Eltoukhy et al. ........ 51/281 SF |
| 5,202,810 A | 4/1993 | Nakamura et al. .......... 360/135 |
| 5,223,304 A | 6/1993 | Yasuda et al. ............... 427/129 |
| 5,277,960 A | * 1/1994 | Tsuya et al. .......... 428/694 SG |
| 5,302,434 A | 4/1994 | Doerner et al. ................. 428/64 |
| 5,307,223 A | 4/1994 | Doerner et al. .......... 360/97.01 |
| 5,307,593 A | 5/1994 | Lucker et al. ........... 51/281 SF |
| 5,326,607 A | 7/1994 | Muramatsu et al. ........... 428/65 |
| 5,353,182 A | 10/1994 | Nakamura et al. .......... 360/104 |
| 5,388,020 A | 2/1995 | Nakamura et al. .......... 360/135 |
| 5,549,954 A | * 8/1996 | Otsuka et al. .............. 428/65.3 |

FOREIGN PATENT DOCUMENTS

| EP | 0 367 510 | 5/1990 | |
|---|---|---|---|
| JP | 1-149217 | * 6/1989 | ........... 428/694 SG |

* cited by examiner

Primary Examiner—Jefferson Evans
(74) Attorney, Agent, or Firm—Kolisch Hartwell, P.C.

(57) ABSTRACT

An electromagnetic read/write system includes a contact interface formed by a pole-structure-carrying wear pad and a recording surface. The uppermost portion of the recording surface is characterized by a buffed, generally planarized topography. Lower elevations of the recording surface may be texturized or untexturized. Various methods of producing such an interface are described. The interface of the present invention provides dramatically improved longevity, i.e, wear performance through long term read/write operation.

14 Claims, 10 Drawing Sheets

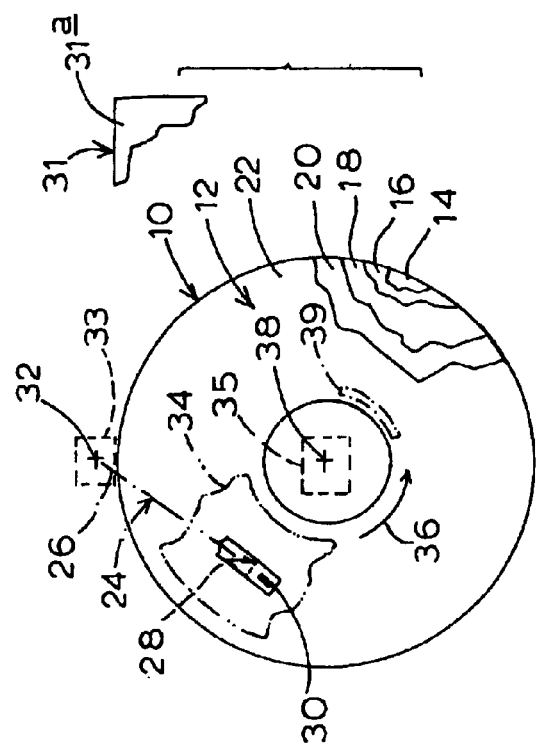
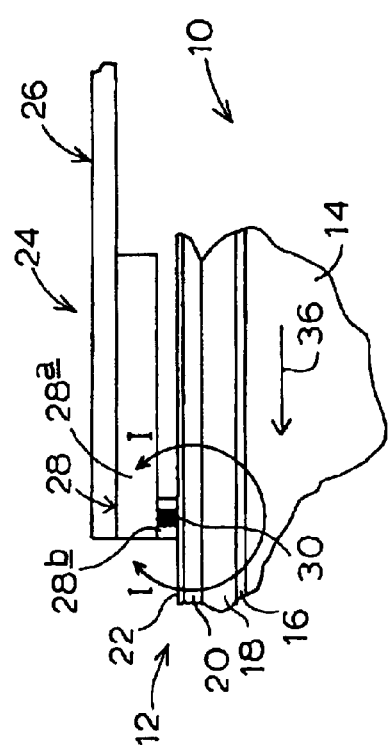
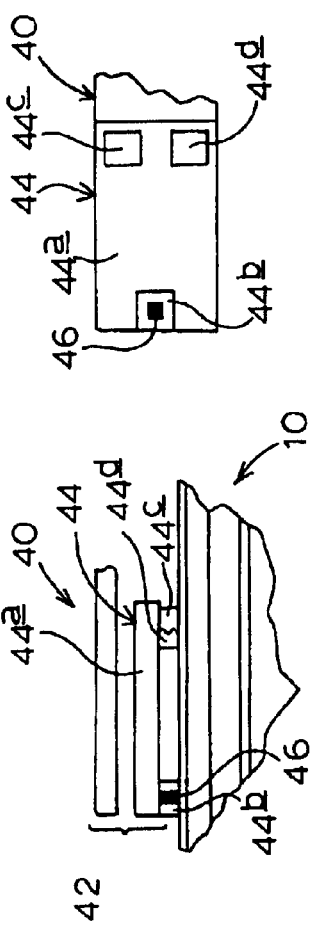

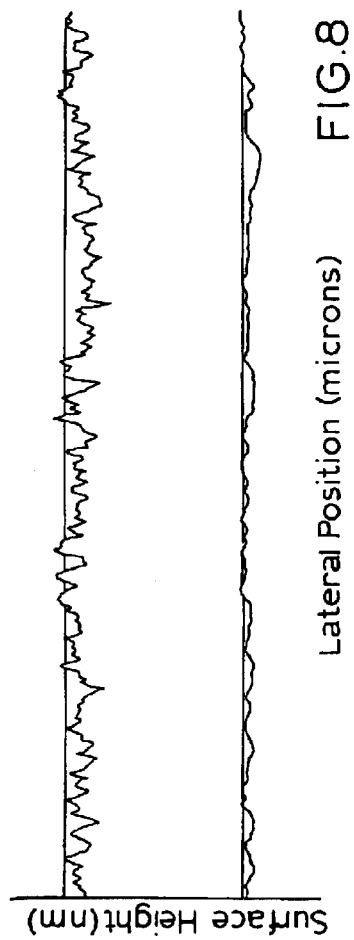
FIG. 8
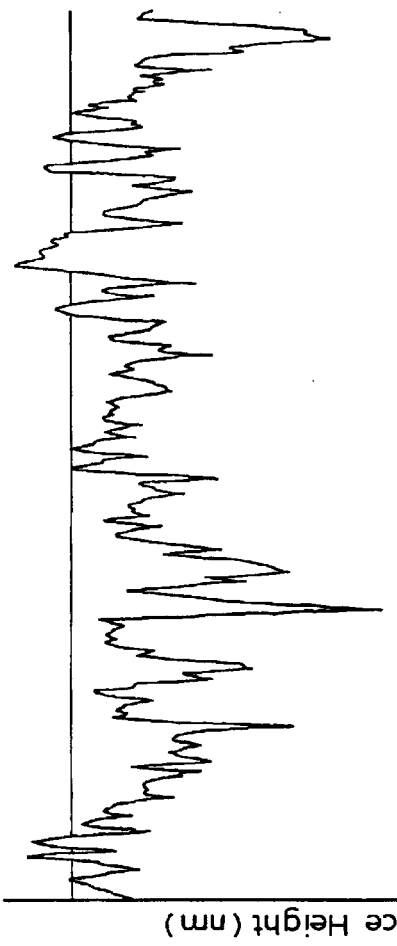
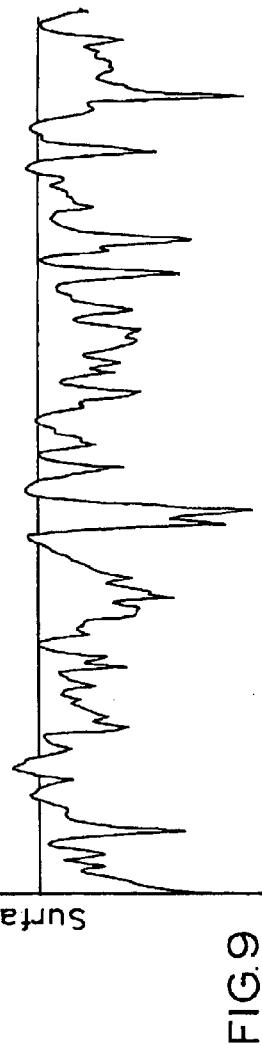
FIG. 9

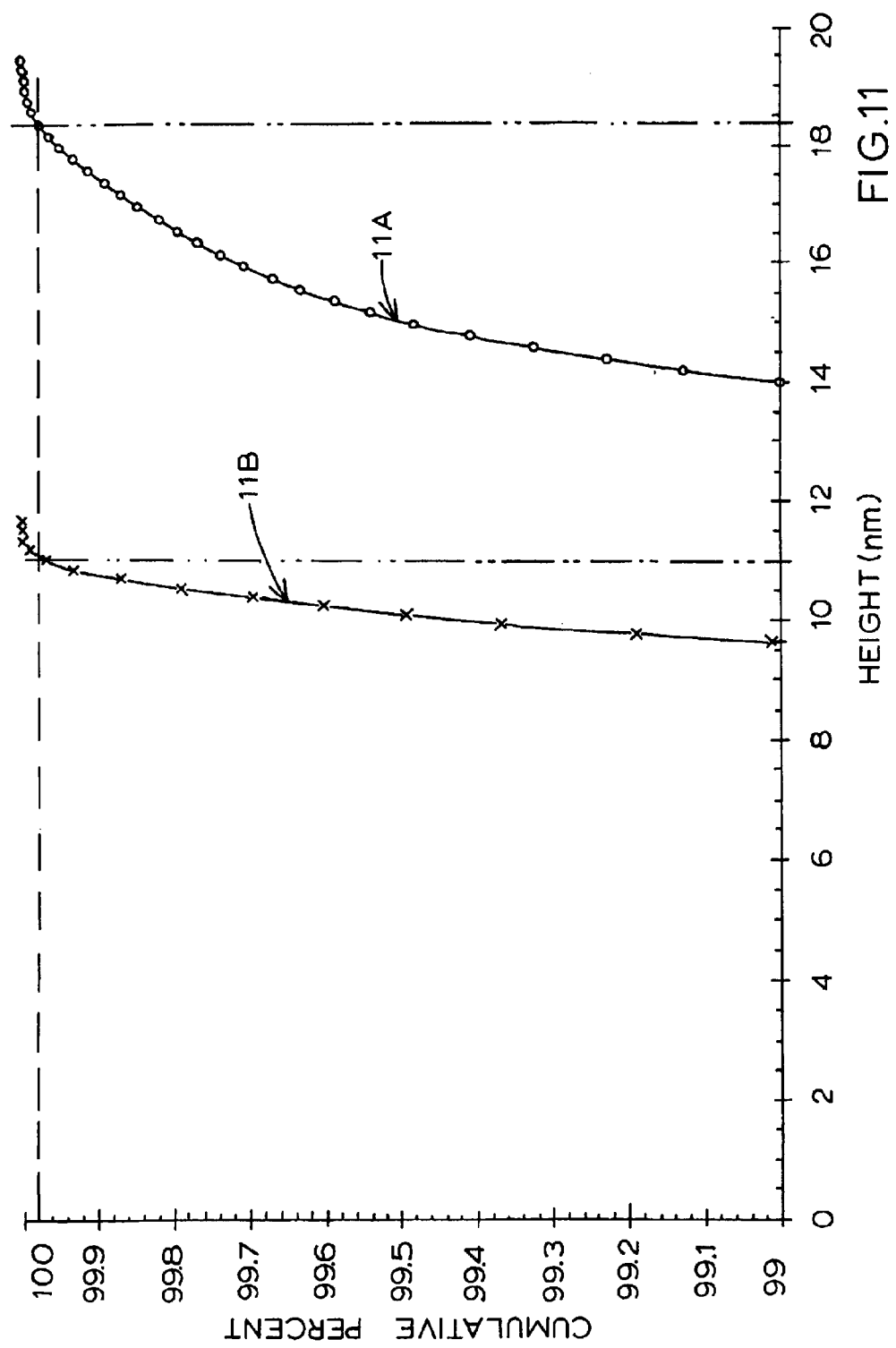

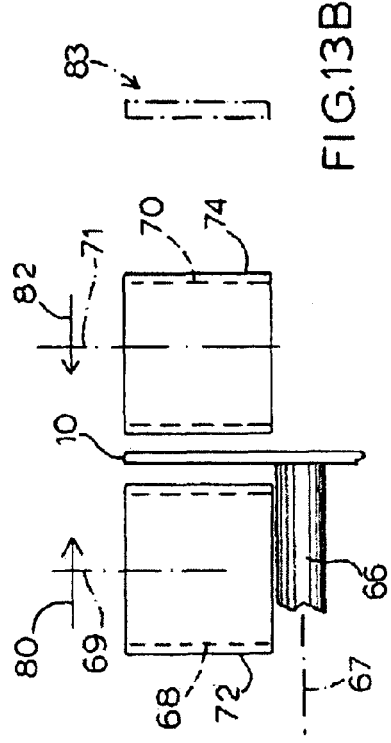
FIG.13A
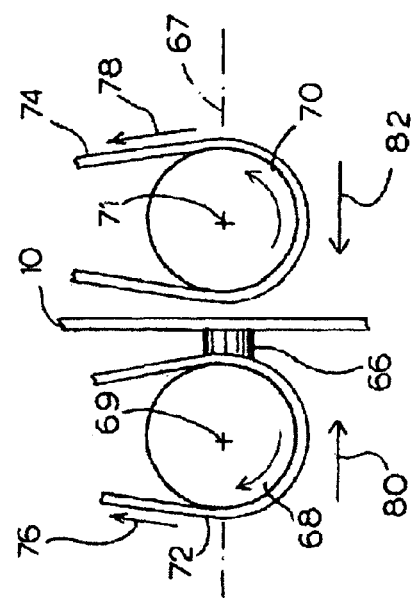
FIG.13B
FIG.13C
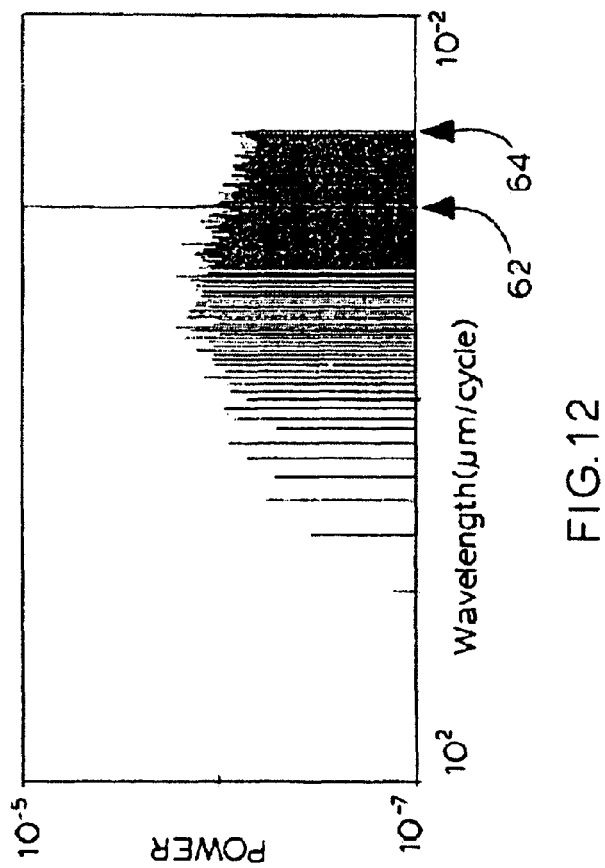
FIG.12

HARD DRIVE SYSTEM INTERFACE BETWEEN A DISK SURFACE AND A TRANSDUCER CONTACTING THE SURFACE DURING COMMUNICATION

FIELD OF THE INVENTION

This invention relates, in an electromagnetic data-storage (information storage and retrieval) system, to the contact (communication) interface between the recording surface of a rigid information storage magnetic recording medium (device), such as a disk, and a read/write head (or transducer) structure which operates in substantially continuous dynamic contact with the medium's surface during reading and writing operations. In particular, the invention focuses upon both the structural characteristics of such a contact interface, and upon the process and methodology of preparing and creating that interface. From another point of view, the invention disclosed herein also relates to a contact recording electromagnetic information storage and retrieval system, also called a read/write system, wherein several important features interact. This system includes, inter alia, a rigid magnetic recording medium, or device, having a surface associated with an adjacent information storage layer, an elongate flexure, a transducer portion joined to, and carried/supported/biased by, that flexure including read/write pole structure embedded within a circumsurrounding, medium-contacting wear pad, and a contact interface in the region of contact between the transducer/wear pad/medium surface which meets the criteria of other features of the present invention. This invention also pertains to the surface structure, per se, of a rigid recording medium.

The term "recording surface" is employed herein as a verbal artifact, widely recognized in the art, to refer collectively to a solid-material structure, typically a layered structure, including the usual information-storage magnetic-recording-layer substructure (typically one or two layers), and the normal protective overcoat (if any) provided on the "transducer side" of the magnetic-recording-layer substructure.

While, to the naked eye, the recording surface of a modern rigid recording medium, such as a rigid disk, appears to be absolutely flat and smooth, on a microscopic level, such a surface is, in truth, inherently irregular, to different degrees of irregularity depending upon the associated surface-preparation technique(s). As will become very apparent from the explanatory and descriptive material which follows hereinbelow, our creation and development of the present invention has involved, largely, an exploration of the microscopic surface irregularity in such a setting. Given this situation, we view the interface surface structure discussed and claimed herein—the landscape, so to speak—in terms of topography and peaks and valleys, etc.

BACKGROUND AND SUMMARY OF THE INVENTION

As has just been expressed above in the "Field of the Invention" section, the novel system, medium and interface of the present invention, and the associated creational processing and methodology, exist in relation to, and in the regime of, contact recording, and in the context of a contact recording system including other important interactive and cooperative structural elements and features. This is a regime which represents a substantial departure from the conventional art of the standard "flying", take-off-and-landing-type systems—a departure which has been pioneered and led by the Censtor Corporation of San Jose, Calif.

While the contributions of the present invention clearly offer utility in a variety of rigid-medium systems, we describe and illustrate those contributions herein particularly in the setting of rigid-disk recording—a setting wherein the invention has been found to proffer great immediate commercial promise.

Most of the pioneering and significant work in this field is disclosed and illustrated in the following, listed U.S. patents and pending U.S. patent applications, and it is our intent, as is now expressed, to have the full disclosure contents of each and every one of these listed patents and patent applications fully incorporated herein by reference:
(a) U.S. Pat. No. 4,751,598, issued Jun. 14, 1988;
(b) U.S. Pat. No. 4,860,139, issued Aug. 22, 1989;
(c) U.S. Pat. No. 5,041,932, issued Aug. 20, 1991;
(d) U.S. Pat. No. 5,073,242, issued Dec. 17, 1991;
(e) U.S. Pat. No. 5,111,351, issued May 5, 1992;
(f) U.S. Pat. No. 5,163,218, issued Nov. 17, 1992;
(g) U.S. Pat. No. 5,174,012, issued Dec. 29, 1992;
(h) U.S. Pat. No. 5,063,712, issued Nov. 12, 1991;
(i) U.S. Pat. No. 4,757,402, issued Jul. 12, 1988;
(j) U.S. Pat. No. 4,636,894, issued Jan. 13, 1987;
(k) U.S. Pat. No. 4,423,450, issued Dec. 27, 1983;
(l) U.S. patent application Ser. No. 08/191,967, filed Feb. 4, 1994;
(m) U.S. patent application Ser. No. 07/992,886, filed Dec. 14, 1992;
(n) U.S. patent application Ser. No. 07/990,005, filed Dec. 10, 1992;
(o) U.S. patent application Ser. No. 07/989,170, filed Dec. 10, 1992;
(p) U.S. patent application Ser. No. 07/806,577, filed Dec. 21, 1991;
(q) U.S. patent application Ser. No. 07/966,095, filed Oct. 22, 1992;
(r) U.S. patent application Ser. No. 08/011,890, filed Feb. 1, 1993; and
(s) U.S. patent application Ser. No. 08/338,394, filed Nov. 14, 1994.

As is recognized in the leading work done by the Censtor Corporation, contact reading and writing offers the most intimate working relationship between a read/write head and a rigid magnetic recording surface. Such intimacy, for a given head geometry, offers the maximum possible linear recording density and signal output level. However, and focussing illustrative attention hereinafter throughout on rigid disk recording, contact operation introduces, significantly, the issue of wear which takes place within the head/disk interface. And, while wear involves both head wear and media wear, in contact operation, it is head wear that is far the more important issue, and is the key factor which decides the usable lifetime of a given recording system. Accordingly, the primary focus of the work leading to the present invention has been solving the problem of head wear.

Accepting the fact that some wear often occurs wherever there is relative motion between two bodies in contact, the challenge of maintaining head wear within acceptable limits in the setting of contact recording is fundamentally one of tribology. Thus, a functional thrust of the present invention has been to establish a contact, head/disk interface which will lead to a head-wear characteristic, or performance, offering a system having, as an illustration, a usable lifetime of five years, under conditions of continuous (24-hours-per-day, everyday) operation.

In the interface proposed by the present invention, the read/write head is embedded, and exposed in a disk-contacting face, within a tiny-footprint (typically about 20-$\mu$m by 20-$\mu$m) contact, or wear, pad. In such a setting, pad wear must be less than about 5-$\mu$m total height change for most read/write transducers. For wear-pad lateral dimensions of 20-$\mu$m by 20-$\mu$m mentioned in the illustration above, this corresponds to a volumetric wear rate of less than about 2000-$\mu m^3$ over the total intended interface lifetime of about 5-years. Such a volume of wear, of course, must be scaled accordingly to accommodate different wear-pad dimensions, as well as to account for the presence of multiple disk-contacting wear pads. The single-pad head geometry tested in one embodiment of the present invention was capable of tolerating the wear volume just mentioned (about 2000-$\mu m^3$) without degradation of read/write performance.

In point of fact, we have discovered that an interface constructed in accordance with the teachings of this invention can lead to as low a figure as 0.1-$\mu$m of vertical wear for over 5-years of continuous-duty operation in a 48-mm disk drive system. When a limited duty cycle of less than 24-hours-per-day is taken into consideration—a duty cycle which typifies the operation of small disk drive systems, head-wear life projections extend far beyond the 5-year satisfactory performance mark.

Preferably, a plurality of the asperities that are within the 100-$\mu$m squared area, rise at least 5-nm from an interposed recess within a 10-$\mu$m lateral extent.

Another permutation of Specification I is for the surface, in its upper most reaches, to include asperities whose tops have an average radius of curvature in the range of about 2.0-$\mu$m to about 100-$\mu$m.

The asperities referred to in the definition of Specification I may also be referred to as "protrusions" and may take the form of curvilinear ridges which are separated by grooves, for example, elongate ridges rising at least 5-nm from interposed grooves extending in non-radial directions.

Similar impressive wear performance is achieved in other-disk-size systems. A 48-mm system has simply been chosen in this and following discussions for the purpose of illustration of the invention.

One feature of the interface of this invention which we believe may play a participating role in minimizing head wear relates to materials. Specifically, our proposed interface is one that exists, with lubricant present, preferably between two amorphous surface materials, such as a chemical-vapor-deposited (CVD) carbon, hydrogenated or nonhydrogenated carbon, nitrogenated or nonnitrogenated carbon, silica and others. Indeed, low-wear performance was first noticed in the contact interface present in the systemic structure described in the '932 patent listed above.

In an embodiment of the invention wherein a single pole-structure-carrying wear pad is rigidly fixed to a suspension, we have devised a wear-rate test with respect to variations in pitch of suspension, the results of which can be used to establish the presence of an interface both made in accordance with the teachings of this invention and capable of sustaining the long period of continuous operation suggested hereinabove as desirable.

Beginning with a flat-lapped pole-structure-carrying wear pad, this test is performed, starting with substantially zero separation (i.e., contact between the pole structure and disk), followed by tilting of the pole-structure-carrying wear pad onto a single edge, applying a known load between this edge and the disk, and reading signal amplitude monitored with respect to written or rewritten data present on the disk. The first-gathered signal-amplitude data, during head/disk contact, tells one the maximum amplitude to be expected.

Regarding, then, the test time and data received after tilting of the pad, the appropriate amplitude/separation loss equation is applied to determine the instantaneous head/disk separation as the signal amplitude "grows back" (as the pole structure reapproaches contact with the disk), from which is calculated the volume removed from the pad due to wear. This method is applicable to both single track and full surface sweep wear rate criteria. The method also provides information regarding the change in wear rate as a function of time.

An alternative to the "tilt" protocol just described, measures the height of the pole-structure-containing wear pad before and after extended sliding of the wear pad on a disk's surface, using either fixed or gimbaled heads, and ordinarily operated in the continuous-sweep mode. The volumetric wear may be obtained by converting the pad height measurements to a change in pad volume. Although this method does not provide information regarding any change in wear with time, it does permit wear rates to be measured for interfaces where electrically-functioning read/write transducers are not available.

In tests performed in accordance with these protocols, we have found that the interface created according to the teachings of this disclosure is characterized by a head-wear performance wherein the volume of head-structure wear, over a 12-hour continuous period of fixed-track-mode contact (3600-rpm; linear relative velocity of about 7.5-m/sec) between a linear edge of a head/wear-pad structure and the surface of the associated rigid disk, and under a contact load of about 40-milligrams, is only typically about 0.7-$\mu m^3$ (and in the range generally of about 0.4- to about 1.0-$\mu m^3$). Such extraordinarily low wear, after the 12-hour period just mentioned, and with the contacting edge of the head structure beginning as a relatively sharp right-angle edge, is not resolvable by even the most powerful available optical microscopes.

This exceptional head-wear performance data acquired in the "12-hour" test, coupled with the observed reduction of wear rate with time, as well as additional data derived from longer-term wear testing, establishes that the requirement of 5-year continuous-operation longevity can predictably be met by our new interface. Systems tested with a contact interface outside the teachings of this invention, for example, have exhibited functional lives as short as 4–6-months, continuous operation.

Accordingly, a general object of the present invention is to provide a contact interface of the type generally described above which is capable of demonstrating the extraordinarily low wear performance just mentioned.

A related object is to provide, on what might be thought of as the "rigid-diskside" (rigid-medium side) of such a contact interface, a disk recording surface, in either a texturized or an untexturized form, having the appropriate structural, topographical characteristics, particularly with respect to the uppermost part of the surface, which enable achievement of the wear performance mentioned.

A further object of the present invention is to provide, in the setting of such a contact interface, a read/write, pole-structure-bearing contact pad designed to contact-coact with such a disk recording surface to yield operational wear performance at the very low wear levels noted earlier. One can view the contact pad as being wrapped around the pole structure.

An object of the invention which is closely related to the first three objects just stated above, is to provide an electromagnetic disk drive read/write contact system which includes an interface of the type generally mentioned, in a setting where the pole-structure-bearing contact pad forms part of structure that is joined to an elongate slender flexure via which the transducer is positioned adjustably (as, for example, by servo-controlled actuator structure) over the recording surface in a motor-rotated rigid disk.

Another object of the invention is to provide an interface of the type generally set forth, wherein the pole-structure-bearing contact pad includes pole structure exposed in a circumsurrounding surface of amorphous, nanocrystalline, or like wear material, such as chemical-vapor-deposited (CVD), alumina, carbon or silica, with the prepared surface of the disk in the interface designed not only to achieve the remarkably low wear rate mentioned hereinabove, but also designed to minimize, substantially to imperceptibility, differential-wear pole-tip recession (from the contacting surface of the pad) over the expected, normal, useful, working lifetime of the disk, i.e. at least about 5-years.

It is also an object of the invention to provide a unique process and methodology for preparing a contact interface of the type which has just been generally discussed, with particular focus on the preparation of a rigid-disk recording surface having an uppermost surface area with the desired structural, topographical characteristics. Such a process may or may not involve steps for texturizing relatively lower levels of the recording surface. It may also involve retro-processing of commercially available texturized disks to modify the uppermost topographical features therein.

Yet another object of the present invention is to provide a dual-surface-characteristic rigid recording medium, such a disk, wherein, for example, the recording-surface area is texturized to reduce contact friction, and an adjacent area, preferably near the inner diameter (ID) of a disk, is nontexturized to provide a stationary, enhanced-capillary-adhesion parking-surface area for receiving transducer contacting structure during periods of nonoperation.

In the process of discovering and examining and testing those key features and process constraints which lie at the core of this invention, we have reached the surprising discovery that, essentially regardless of the character of surface topography at lower elevations of a recording surface, it is the topography of the uppermost reaches of that surface, for example the highest 1.0%, which dictates, and differentiates, the regimes, on the one hand of unacceptable, high-wear contact performance, and on the other hand, of dramatically improved and fully acceptable, low-wear contact performance. In essence, we have discovered that one can substantially ignore topographical features below the uppermost reaches of the surface, and achieve surprisingly acceptable wear performance by directing attention only toward establishing topographical features in the highest regions of the landscape—features which come within any one of the several surface-quality Specifications identified and described hereinbelow as Specifications I, II and III. This recognition about the region of most important interest, vis-a-vis controlling wear, opens the door, as we have found, to the creation and successful utilization of this invention with respect to a whole host of different types of disk surfaces, including disk surfaces which have the very smoothest landscapes (nontexturized surfaces), as well as those with the roughest landscapes (texturized surfaces characterized by plural, concentric, alternating, annular grooves and ridges).

While we recognize that the creation of a disk surface having the desirable topographical characteristics may be prepared perhaps in a variety of different ways, we have determined that a very important and very successful technique for achieving final acceptable surface topography involves a buffing procedure which we refer to herein as kiss-buffing (to be described below). We also refer to this procedure as process-grading.

According to a preferred embodiment of the invention, the proposed contact interface takes the form of an organization including a rigid recording disk having a magnetic recording surface with a topography characterized by a defined surface quality which meets any one of three surface-quality Specifications (described below in detail as Specifications I, II and III). A fluorocarbon or hydrocarbon lubricant film, for example, of perfluoropolyether or phosphazene, is distributed on the recording surface with a thickness in the range of about 1- to about 2.5-nm (and preferably no less than about 1-nm) as measured by any one of three techniques (identified and described in detail below as Techniques I, II and III). At least one read/write, pole-structure-bearing contact pad (or instrumentality) is in contact with the lubricated surface. The pole structure is embedded within and circumsurrounded by the pad.

A preferred method of preparing such a contact interface, according to one way of practicing the invention, includes generally, and beginning with a disk blank having a surface which has been coated with a metallic underlayer, (1) polishing the coated surface, (2) washing the polished surface, (3) applying a layer (or layers, where required) of magnetic recording material to the washed surface and overcoating the same with a layer of carbon or silica, (4) kiss-buffing (fully described below) the overcoat, (5) washing the kiss-buffed surface to effect surface debris removal, (6) lubricating (and then wiping excess lubricant from) that washed surface, and (7) conducting a glide-height test. Surface polishing (step (1) above) is accomplished by a unique two-stage (two-step) polishing procedure also described below.

Another method according to the present invention for preparing a recording surface exhibiting the desired wear performance, involves kiss-buffing a previously roughened or texturized surface of a recording medium to reduce asperity height on, and to smooth the tops of, the ridges therein. This method may be practiced by inserting a texturizing step at some point in time before the kiss-buffing step (4) in the protocol set forth above. Alternatively, a fully processed texturized disk, such as one originally produced for use with a flying head, may be retro-processed to within the topographic Specifications of the present invention by stripping the lubricant, kiss-buffing and relubricating the disk surface.

An interesting bonus benefit derived from the present invention, as we now see it, is that a medium (disk) prepared according to our teachings as these relate to texturized disks, results in a disk structure useable both in contact and in non-contact (flying) environments.

These and other features, objects and advantages that are offered by the structure and method of the present invention will become more fully apparent as the description which now follows is read in conjunction with the accompanying drawings.

DESCRIPTION OF THE DRAWINGS

FIG. 1 is a fragmentary side view of one embodiment of a contact interface prepared and structured in accordance with the teachings of the present invention. The interface pictured in this figure is one which exists between the surface of a rigid magnetic recording disk and a single, pole-structure-bearing contact pad, and is embraced in this figure by a partially circular, double-ended curved arrow, labeled I-I.

FIGS. 2A and 2B are views of another embodiment of a contact interface following the teachings of the present invention, with FIG. 2A being a view taken generally from the same point of view presented in FIG. 1, and with FIG. 2B being a view taken from the underside of FIG. 2A, just above the disk surface, displaying the underside of a modified disk-contacting transducer chip (unit) which includes three disk-contacting wear pads, one of which contains the actual read/write transducer pole structure.

FIG. 3 is a view, on a smaller scale than that employed in FIGS. 1 and 2, illustrating, with some parts being shown fragmentarily, an overall view (partially schematic) of a system including the disk and transducer structure of FIG. 1 (the latter structure being joined to one end of an elongate flexure), and with surface layers in the disk partially peeled away to reveal their organizational locations.

FIG. 8 is a view which, in an upper trace, illustrates a typical short-linear crosssectional view taken in a surface like that of FIG. 4, and which, in a lower trace, illustrates a typical short-linear cross-sectional view taken in a surface like that of FIG. 5.

FIG. 9 illustrates, in an upper trace in this figure, a typical short-linear crosssectional view taken in a surface like the surface of FIG. 6, and in a lower trace in this figure, a typical short-linear cross-sectional view taken in a surface like that of FIG. 7.

FIG. 11 pictures portions of two bearing area curves plotting cumulative percentage of area vs. height (relative to a defined datum plane) for two surfaces such as the ones shown in FIGS. 6 and 7, and cross-sectioned in FIG. 9.

FIGS. 5, 7, 8 (lower trace) and 9 (lower trace) help to illustrate surface Specification I herein.

FIGS. 10 and 11 help to illustrate surface Specification II herein.

FIG. 12 is a power spectrum which illustrates a rigid recording-medium surface which has been prepared in accordance with the present invention and which meets what is referred to herein as surface Specification III.

FIGS. 13A, 13B and 13C illustrate the surface-preparing procedure (process-grading) which we refer to as buffing and as kiss-buffing.

DETAILED DESCRIPTION OF, AND BEST MODE FOR CARRYING OUT, THE INVENTION

Figure 4:
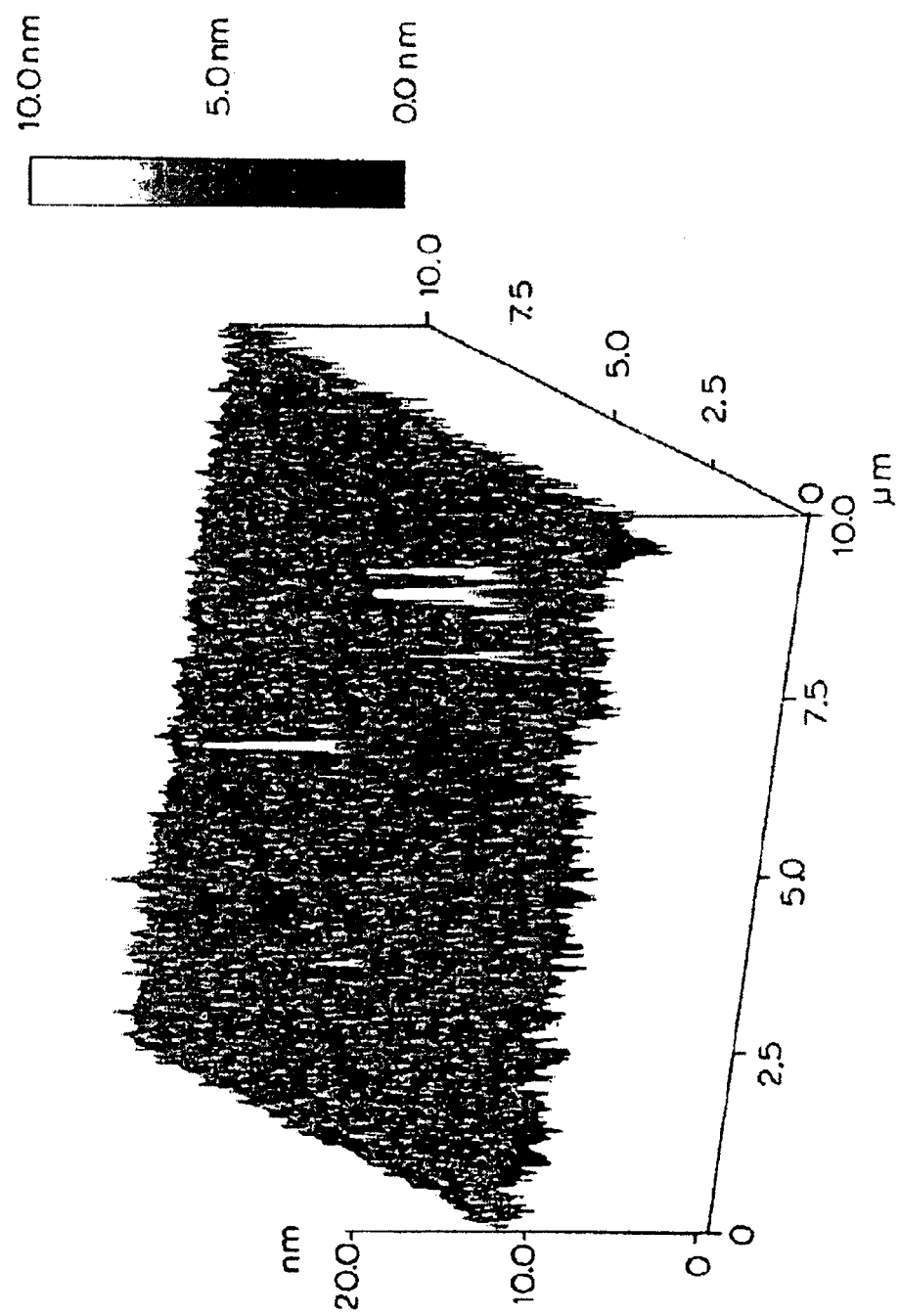
FIG. 4 illustrates a small rectilinear region of a recording-medium surface having a typical microtopographic surface quality as the same generally appears in a pre-final, or precursor-to-final, (pre-process-graded) stage during surface preparation in accordance with the teachings of this invention, and in particular, with reference to what is referred to herein as an untexturized surface. This figure depicts an Atomic Force Microscope (AFM) image.

Turning now to the drawings, and referring first of all to FIGS. 1–3, inclusive, indicated generally at 10 is the upper side of a rigid magnetic recording medium, in the form of a rigid recording disk, having a recording surface 12 which is characterized by a topography prepared in accordance with the teachings of this invention. Disk 10 includes a substrate 14, typically made of aluminum, which has been coated, for example on its upper side in FIG. 1, with a thin (typically about 10- to about 11-$\mu$m) metallic (typically nickel alloy) underlayer 16, polished in accordance with a procedure which is described hereinbelow to a thickness of about 7.5-$\mu$m, and over which has been prepared a sputter-deposited magnetic recording layer 18. For drawing convenience, layer 18 is illustrated herein as being only a single layer, but it should be understood that it could be a single layer or plural layers. Conventionally deposited on top of layer 18 is a sputtered overcoat 20 (starting thickness of about 10-nm) of carbon (hydrogenated, nonhydrogenated, nitrogenated or nonnitrogenated), or silica, whose upper surface in FIG. 1 has been kiss-buffed (buffed and smoothed) in a manner still to be described according to the teachings of the present invention. Overcoat 20, which, after kiss-buffing, preferably has a thickness greater than about 8-nm, carries a thin film 22 of a lubricant (composed primarily of a substance including a substantial molar fraction of at least one of fluorocarbons and hydrocarbons), such as a perfluoropolyether or phosphazene lubricant, distributed on the overcoat in a manner also dictated by the teachings of this invention.

Shown at 24 in FIG. 1 is a head/flexure/conductor structure including an elongate, slender flexure, or flexure body, 26, to the underside of the left end of which in FIG. 1 is suitably joined a head (or transducer) unit (or portion) 28 having a unit body 28a and a single, downwardly projecting, CVD carbon, pole-structure-bearing contact (wear) pad (or instrumentality) 28b which contains embedded and circumsurrounded pole structure 30 that forms part of an appropriate transducer. Pole structure 30, together with the circumsurrounding wear pad, is in contact with the upper surface of disk 10. The transducer mentioned may be of any suitable design and, for example, may be of the longitudinal recording type, the perpendicular recording type, or other. In the organization now being described, and for specific illustration purposes in the description presented herein, the transducer is a probe-type transducer designed for perpendicular recording, and disk 10 is of the dual-layer perpendicular variety made up of underlayer 16 and recording layer 18.

While in the structural organization which is now being described, contact pad 28b is formed entirely of CVD carbon (except for the presence of pole structure 30), it should be understood that the pad only needs to contain appropriate wear material, such as CVD carbon (an amorphous and nanocrystalline substance), on that face of the contact pad which is to come into contact with disk, and with a thickness (relative to a line which is normal to the contacting disk's surface) which could be as thin as that which is required to sustain the expected amount of vertical wear during the intended operating lifetime. Thus, and in accordance with testing and data which has led to the disclosure herein, this thickness might typically be in the range of about 1- to about 20-$\mu$m. The contact pad, or at least the contacting portion thereof, could also be formed of silica or alumina in certain applications.

The coil (or coils) employed with pole structure 30, which is (are) embedded within unit body 28a, connects with the "outside world" via elongate conductors which extend within, or which otherwise form part of, flexure 26. Head unit 28 may be either a preformed individual which has been bonded in a suitable fashion to the end of flexure 26, or it may be one that has been formed along with the flexure as a unitary integral construction. The flexure supports and carries the head unit, and, in an assembled system, biases the head unit into loaded contact engagement with a disk's recording surface.

The structural location of the novel contact interface proposed by the present invention lies in the region of direct contact in FIG. 1 between contact pad 28b and disk surface 12. This interface region, referred to sometimes herein as interface I, is embraced by the partially circular, double-ended arrow I-I in FIG. 1. In this interfacial region there exists what we refer to herein as an electromagnetic signal-communication via. It is by way of this via that, during reading and writing operations, an "electromagnetic communication signal condition" exists.

Jumping attention for a moment to FIG. 3, one can see that the head/flexure/conductor structure resides in a contact rigid-disk system 31, wherein it is mounted on a system frame 31a for swinging about an axis 32 (under the influence of a powered, servo-controlled actuator 33) for movement and positioning of pole structure 30 over different radially displaced tracks (not shown) distributed within the inner and outer diameters of a selected recording-surface area, shown fragmentarily in dash-double-dot lines at 34. Disk 10 herein rotates (under the influence of a drive motor 35) in the direction of arrow 36 (shown in FIGS. 1 and 3) about a motor drive axis 38 with a speed which creates, in the immediate region of interface I, a relative surface velocity (in what is referred to herein as a relative-motion contact zone) between the contact pad and the disk surface relating to a rotational speed of about 3600-RPM. If desired, and there may be applications where this is preferable, the disk's rotational direction may be reversed. Additional head/flexure/conductor structures may be present on disk surface 12.

The specific system (system 31) which is being illustrated and described herein is one which employs a disk having a diameter of about 48-mm. And, while the discussion so far has only referred to the "upper side" of the disk, disk 10 herein is actually a doublesided disk which includes on its "bottom side" (not illustrated) a surface structure and underlying layer structure like that just described in relation to the upper side of the disk shown in FIGS. 1 and 3. For use on and with respect to this lower side of the disk, there is provided one or more additional head/flexure/conductor structure(s) like structure 26, positioned with a pole-structure-bearing, contacting wear pad like wear pad 28b.

Indicated by dash-dot lines at 39 in FIG. 3, on the ID side of disk 10 relative to area 34, is a "parking-surface" zone which can be created for, and used in, a modified disk surface according to this invention. Parking-surface zone 39 is one which is formed in what is referred to herein as a dual-surface-characteristic disk surface to provide an enhanced capillary-gripping region to receive the contacting structure during periods of nonoperation. The presence of such a parking-surface zone can aid in stabilizing the disk-contacting structure against, for example, jostling and jolts, etc. when that contacting structure is simply sitting on the nonrotating disk. More will be said about the surface characteristic of a parking-surface zone, like zone 39, vis-a-vis the surface characteristic of a recording area (recording-surface zone), like recording area 34, a little bit later in this text.

Looking now briefly at the contents of FIGS. 2A and 2B, these figures illustrate, in another system which is otherwise like system 31, a somewhat modified form of interface. Disk 10, shown here in FIG. 2A, is the same disk shown in FIG. 1. Here, however, there is a head/flexure/conductor structure that includes an elongate flexure, or flexure body, 40 which, through a suitable gimbal mechanism (not shown but represented by bracket 42 in FIG. 2A), carries a head (or transducer) unit (portion) 44 which is somewhat different from previously described unit 28. More particularly, head unit 44 includes a unit body 44a, on the underside of which in FIG. 2A (and the side facing the viewer in FIG. 2B) are three, CVD carbon (or alumina or silica), downwardly projecting contact (wear) pads 44b, 44c, 44d. In this structure, it is contact pad 44b which bears within it a read/write transducer pole structure 46 which is like previously-mentioned pole structure 30. The same comments made earlier hereinabove about whether each contact pad is made wholly or only partially of wear material, like CVD carbon, is applicable as well to the interface structure illustrated in and described with respect to FIGS. 2A, 2B. Unit 44 may be bonded in the orientation shown or in the reverse orientation with respect to the flexure body. Disk 10 can be in rotational motion in either direction relative to the transducer.

The coil (or coils) associated with pole structure 46 is (are) formed within head unit 44, and connects, through the unshown gimbal structure, to elongate conductors which are disposed within, or which otherwise form part of, flexure 40.

In a system employing a gimbaled "tri-pad" head unit, such as head unit 44, the interface (a modified form) exists in the regions of contact between the three contact pads and the associated surface of a disk like disk 10.

As was mentioned above in the background and summary portion of this specification, and looking at the disk side of the interface proposed by this invention, disk 10 herein has a recording surface with a surface topography that is characterized, inter alia, by a defined surface quality which meets any one of several surface-quality Specifications, referred to herein as Specifications I, II and III.

As a lead-in to describing and discussing these three Specifications which we use independently to characterize a medium surface created in accordance with the teachings of this invention, let us first set the stage for understanding by describing the surface topography measurement protocol which we have employed to generate the database from which the Specifications have been discerned. The protocol is also for us and others to measure a particular surface for the purpose of determining whether it does or does not meet any one of the Specifications.

Topographic characterization of disk surfaces is performed using an Atomic Force Microscope (AFM). This instrument combines a laser optical detection system for high resolution lateral control and measurement. The specific apparatus used at Censtor, for developing surface topographic specifications associated with kiss-buffing and low head wear, is a Large Sample Stage Multimode™ Nanoscope® III AFM, manufactured by Digital Instruments, Inc., of Santa Barbara, Calif. On this instrument the measurement is performed by scanning a sharp, vibrating silicon tip over the sample surface (a mode of operation developed and patented by Digital called Tapping Mode™). The portion of the surface characterized for the Specifications is a square region which is 10-$\mu$m×10-$\mu$m, divided into 512 scan lines, each containing 512 data points representing the height of the surface at each location. This sets the sampling interval at 10-$\mu$um÷512, or one sample every 19.53-nm. A disk sample is typically positioned on the instrument stage such that the horizontal scans made by the tip are generally in the radial direction of the disk, and the vertical steps between successive scans are generally tangential to the azimuthal or rotational direction. Visual representation of the height data as a function of horizontal and vertical position provides an "image" of the sample surface. Any surface region analyzed by this method should be free of particulate contamination in order to yield reliable information regarding surface topography.

The topographic data are analyzed using algorithms which are widely known and standard in the practice of surface topographic analysis. In all cases, the raw data are processed before analysis by a routine two-step procedure designed to reduce the effects of non-linearities in the response of the piezoelectric scanners controlling the AFM tip, as well as to sample misalignment and other factors leading to image bow or tilt. The first step involves "flattening" the data, by calculating a least squares-fitted polynomial of second order for each scan line and subtracting it from that line of data. The second step involves "planefitting" the data, by subtracting from the data a single second-order polynomial fit to the entire image in the horizontal direction only. This procedure is designed to ensure that the data more faithfully reproduce the actual sample surface topography.

There are three analysis procedures used in the Specifications, all of which allow calculation of a characteristic of the surface topography associated with the uppermost peaks of the surface as measured using the AFM. Each makes use of the concept of a height level corresponding to a given cumulative percentage of the surface. This level may be arrived at through the use of a table such as would be generated to obtain a histogram for statistical analysis of a group of numbers: the rows of the table are arranged in order of increasing magnitude inclusive of the minimum and maximum data values (depth of the lowest valley and height of the highest peak, respectively), and each row represents a range of heights which is small (typically less than 0.5%) compared to the overall range of values contained in the data set; into each row is entered the number of data points falling within its height range which are found in the data set. This table thus contains the incremental frequencies of occurrence for height values within the range of each row. From this information a new column may be generated representing the cumulative percentage of the surface falling within or below the height range associated with each row: The number of data points in each row is summed with the total number found in all rows of lower height, and this quantity is then expressed as a percentage of the total number of data points contained in the entire data set (typically $512^2$ or 262,144). For any desired cumulative percentage of surface, the corresponding height is thus the average value of the height range associated with the row in which the cumulative percentage is found. Intermediate values may be found by interpolation. A graphical representation of the heights as a function of the cumulative percentage of the surface with which they are associated is known as the bearing area curve.

The first Specification refers to the average radius of curvature associated with asperity peaks in that portion of the surface falling between the 99.00 (cumulative) percent height level and the 99.99% height level. This quantity is obtained from the processed AFM data after application of a clipping procedure, in which all data values below the 99.00% height value are set equal to that value, and similarly all values above the 99.99% height value are set equal to that value. The upper clipping boundary is used to exclude from consideration data which may not be statistically representative of the sample surface, i.e., noise. Subsequently, individual radii of curvature are calculated along each of the 512-scan-lines for those points where at least three consecutive points lie above the 99.00% height level. For each such set of three consecutive points, a radius of curvature is calculated using the equation:

$$R = d^2/8 \text{ h}$$

where d is the distance between the first and third of these three points and h is the distance between the second point and a point located on the midpoint of a line connecting the first and third points. The average radius of curvature is then calculated by averaging the reciprocals of each of these individual values, and then taking the reciprocal of that average quantity.

The second Specification refers to the height difference between the 99.00% height level and the 99.98% height level, which may be directly obtained from the height distribution table or the bearing area curve.

The third Specification refers to the equivalent root-mean-squared (RMS) roughness contributed by the limited range of lateral wavelengths between 100-nm/cycle and 40-nm/cycle, for that portion of the surface falling between the 99.00% height level and the 99.99% height level. This analysis involves clipping the data values as described previously for the analysis of the first Specification, and subsequently obtaining the power spectrum for the resulting data set, using an algorithm corresponding to the ASTM E-42.14 STM/AFM Subcommittee recommendation for analyzing and reporting surface roughness, and contained in the software provided with the Digital Instruments AFM. The power spectrum is the power spectral density corresponding to each of the lateral wavelengths contained in the data, the minimum and maximum limits of which are related to the sampling interval, and to the radius of curvature of the AFM tip and to the overall scan size, respectively. The equivalent RMS roughness is calculated for the desired range of wavelengths by integrating the power spectral densities over the desired range of wavelengths, and subsequently calculating the square root of that integral.

Specification I

Specification I is met by a surface having, within a 100-$\mu$m area in the highest 1.0% thereof, excepting the uppermost 0.01%, asperities whose tops have an average radius of curvature no less than about 2-$\mu$m. This average radius of curvature is that which is "seen" in a plane substantially normal to the nominal plane of the measured surface.

While Specification I has been limited to the above-described tops having radii of curvature no less than about 2-μm, we realize that tops having, on the average, radii of curvature greater than about 1.5-μm are advantageous, and that tops having, on the average, radii of curvature of at least about 4-μm are preferable.

Exploring Specification I a little bit further now, let us take a look initially at FIGS. 4–9, inclusive. As one reads the discussion which now follows, one should recall that the features and advantages of the present invention are Treatable and extant, according to the invention, in what might be thought of as two generically different types of interfaces—one of which involves what we refer to as an untexturized disk surface, and the other of which falls into a category which we refer to as a texturized disk surface. With this in mind, let us begin with particular focus on FIGS. 4, 5 and 8 which help to illustrate the significance of Specification I as it relates to the surface of an untexturized disk.

In FIG. 4, what we see is a small fragment (10-μm by 10-μm) of a carbon-overcoated untexturized disk surface which resides in what is referred to herein as a precursor-to-final stage (or pre-final state) of surface microtopography. This microtopography, is characterized by densely congregated (i.e., high lateral frequency) asperities (protrusions) whose tops have an average radius of curvature which is significantly smaller than the 2-μm Specification I characteristic just mentioned above. In looking at FIG. 4, one should note that the lateral dimensions of the topographic area depicted are set forth on the scale of μm, and the out-of-plane (height) dimension or direction is set forth along a scale measured in nm. Accordingly, what might be thought of as the high-frequency spikiness of the surface is exaggerated for illustrative purposes.

Figure 5:
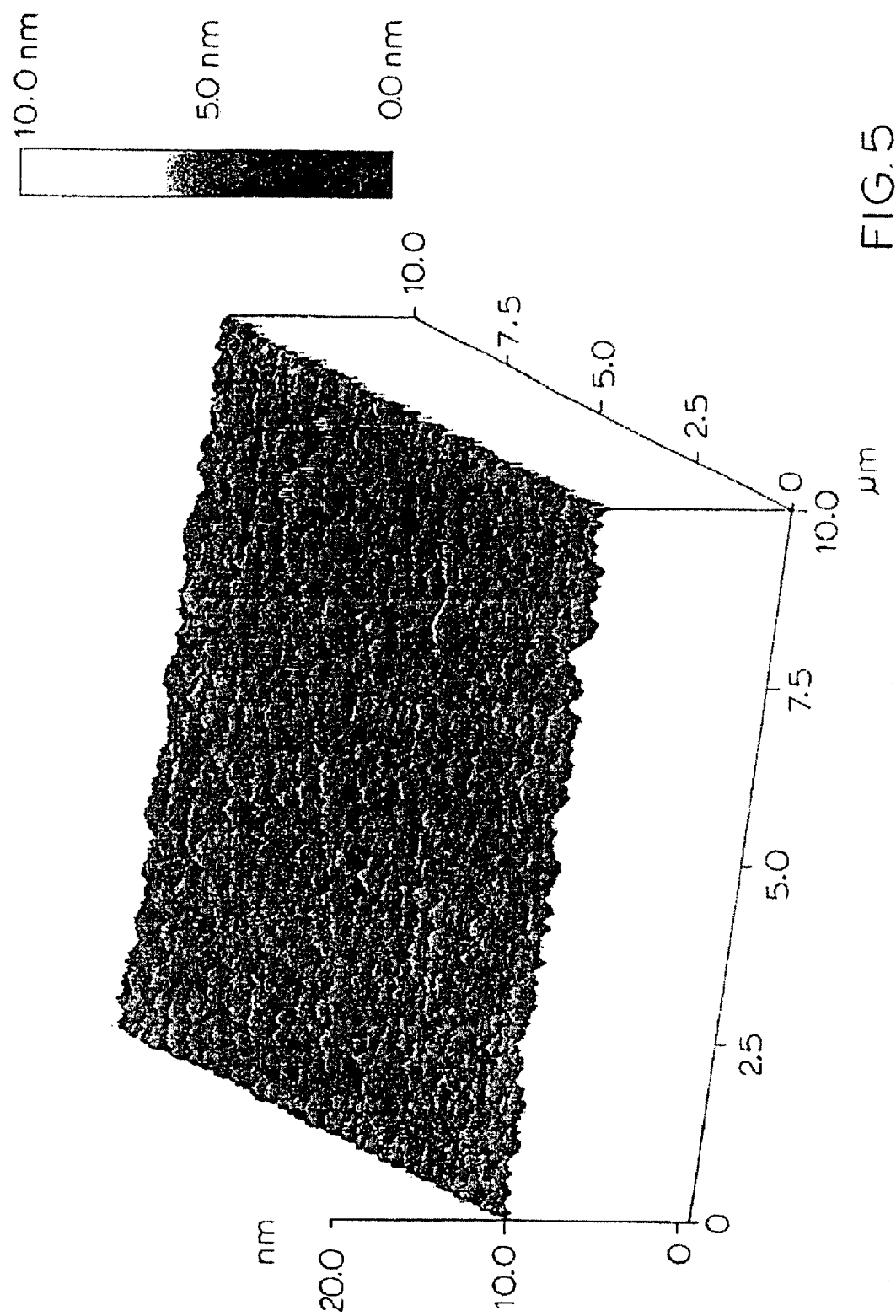
FIG. 5 is a view illustrating a surface like that of FIG. 4 after final surface processing (post-process-graded) in accordance with the teachings of this invention.

Shifting attention now to FIG. 5, here what one sees is the microtopography of a surface which, in its "precursor" condition, looked very much like the surface in FIG. 4. However, the FIG. 5 surface has been fully processed to a final (process-graded) state in accordance with the teachings of the present invention to have a smoothed, buffed surface condition which, in relation to the surface condition pictured in FIG. 4, is substantially more planarized, with asperities whose tops, at least within the upper 1.0% of the entire surface, have an average radius of curvature which is significantly greater than those depicted in FIG. 4. In particular, these tops, on the average, have a curvature radius no less than about 4-μm. The surface pictured in FIG. 5 has a lateral scale measured and pictured in μm, and a height scale pictured and measured in nm, such as is the case with what is pictured in FIG. 4. Thus, while the actual radii of curvature discernable in these two figures are distorted, a comparison shows the dramatic relative change which appears in the buffed surface of FIG. 5 when compared with the unbuffed surface of FIG. 4.

Looking now at the upper and lower traces pictured in FIG. 8 as the same relate, respectively, to the surfaces shown in FIGS. 4 and 5, and recognizing that these traces are not necessarily drawn to precise scale but rather are presented principally to illustrate generally the natures of the two surfaces, the upper trace in FIG. 8 pictures a typical short-linear cross-sectional slice through a piece of the surface of FIG. 4, and the lower trace in FIG. 8 shows the same kind of slice taken through a typical stretch in the surface of FIG. 5. The straight horizontal lines which extend effectively through and along these traces can be thought of as being representative of the 1.0% bearing plane which is mentioned in and which forms part of Specification I. This bearing plane is also referred to herein as a preselected, nominal, base datum plane. These two traces clearly, by comparison, illustrate the improved planarization, reduction of spikiness, and gentle, radius-enlarging rounding which characterizes the final buffed surface (lower trace) when compared with the precursor unbuffed surface (upper trace).

In considering the significance of Specification I, and the illustration thereof which is pictured in FIGS. 4, 5, and 8, it is important to recall that this Specification focuses attention on topographical features which exist at the very uppermost reaches of the pictured surfaces—at the tops of the asperities in the surfaces.

Figure 6:
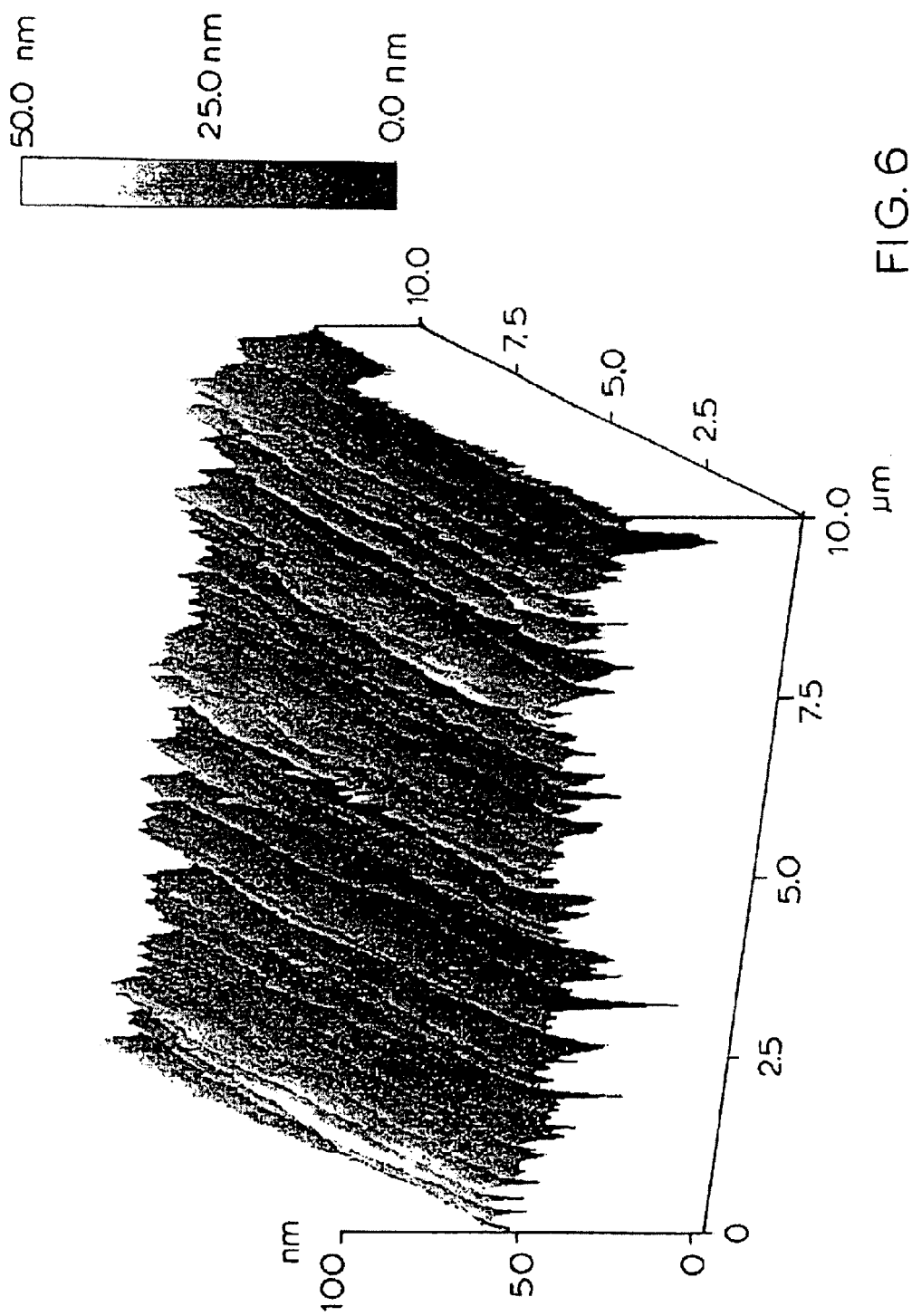
FIG. 6 shows a small rectilinear region of a recording-medium surface illustrating a typical microtopographic surface quality as the same appears, in a pre-final, or precursor-to-final, (pre-process-graded) stage of processing, with respect to what is referred to herein as a texturized surface.
Figure 7:
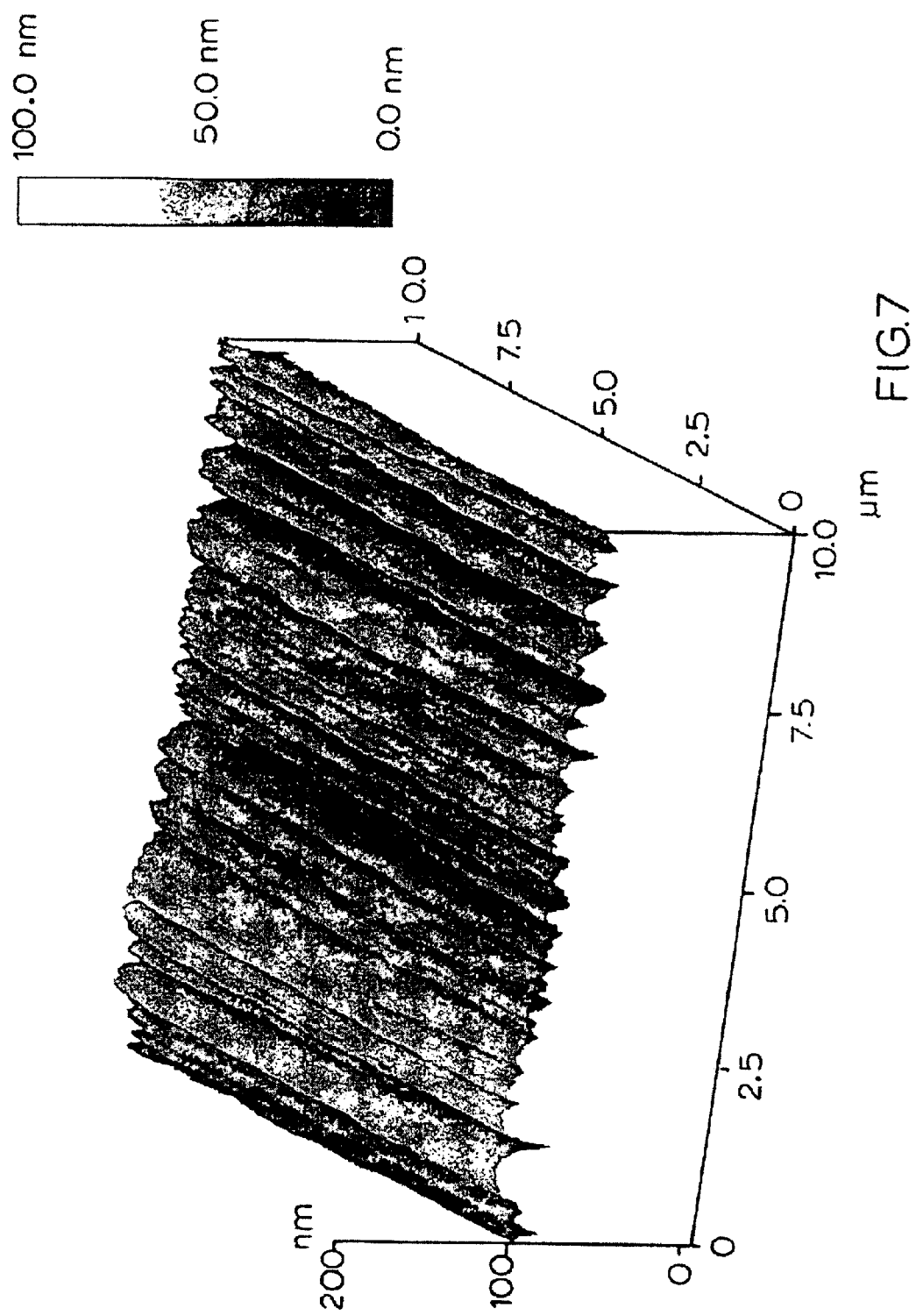
FIG. 7 is a view of a surface like that of FIG. 6 after final surface processing (post-process-graded) in accordance with the teachings of this invention. This figure has a different vertical scale than that of FIG. 6.

Switching discussion to FIGS. 6, 7 and 9, with respect to which we are still focussing attention on Specification I, here one sees views (like those which have just been discussed in relation to this Specification) that particularly illustrate what is referred to herein as a texturized disk surface that has been overcoated with carbon. Texturization processes disclosed in the prior art may be performed according to conventional practices to create, in essence, microscopic, concentric, annular, alternating grooves and ridges in the surface of a rigid-disk recording medium. Annular concentric texturizing is, for example, described in U.S. Pat. No. 5,166,006, issued on Nov. 24, 1992 to Lal et al., and for the purpose of background information, that patent is hereby incorporated by reference.

One thing which should remain in clear mental center stage in understanding the application of Specification I to a texturized surface, is that Specification I focuses attention on the topographical characteristic which exists in the uppermost 1.0% (excepting the uppermost 0.01%) surface portion of the overall disk recording surface. What this therefore implies is that, in applying, and understanding the utilization of, Specification I to such a surface, one really must be thinking about, and directing attention to, the microtopographical features which exist along what might be thought of as the crests or tops of the ridges of the annular, radially-displaced structures which result in a texturized surface.

In FIG. 6, what one sees is what we refer to herein as a precursor-to-final stage (or pre-final state) texturized recording medium surface which has been overcoated with carbon. This surface which, as can be seen, is quite jagged in nature, with the ridges of the annular structures having asperity tops with an average radius of curvature significantly smaller than the 2-μm component of Specification I, is that which exists prior to final processing (such as buffing) in accordance with the present invention.

FIG. 7 relates to FIG. 6 in the same manner that FIG. 5 relates to FIG. 4, and it is in FIG. 7 that one can see how the upper extremities of the texturized-formed ridges have been buffed to substantially better planarization and great smoothness. Asperities in the uppermost reaches of the surface pictured here have tops each, on the average, with a radius of curvature which is no less than about 2-μm.

Moving along, the upper and lower traces in FIG. 9 relate to FIGS. 6 and 7, respectively, in the same manners in that the upper and lower traces in FIG. 8 relate, respectively, to FIGS. 4 and 5. Thus, the story which is told by comparing the upper and lower traces in FIG. 9, vis-a-vis how the final buffed surface (upper 1.0%, excepting the uppermost 0.01%, of surface area) appears, is believed to be self-explanatory. As was true in the case of FIG. 8, the horizontal lines extending along and through the upper and lower traces in FIG. 9 can be interpreted to indicate the location of the 1.0% bearing plane extending immediately adjacent the uppermost reaches of the surface cross sections that are shown. This plane is also one which is referred to alternatively herein as a pre-selected, nominal, base datum plane.

Recalling, from the discussion presented above relating to system 31, that interface I can be characterized, during system operation, as defining a relative-motion zone of sliding (rubbing) contact between the surface of a medium and the contact instrumentality which carries the read/write pole structure, and recognizing that, during such operation, the contact instrumentality will encounter the process-graded rounded-top asperities which exist within the upper 1.0%, excepting the uppermost 0.01%, of the recording surface, Specification I provides another and very different way of viewing the novel interface of the present invention. In particular, and if one thinks of a line which is substantially normal to the medium surface as the Z-axis, then one can see the interface as one wherein, for a given relative linear speed of sliding engagement(s) between the contact instrumentality and the recording surface within the relative-motion contact zone, such engagements produce Z-axis accelerations of the instrumentality away from the medium surface, which accelerations are maximally limited, on the average, to that acceleration which is producible by engagement of the instrumentality with an asperity having a rounded-top radius-of-curvature no less than about 2-$\mu$m.

Specification II

Specification II is met by a surface wherein the distance from the plane separating the highest 0.02% of the surface from the lower 99.98% of the surface and the plane separating the highest 1.0% of the surface from the lower 99.0% of the surface is no more than about 1.5-nm, measured over an area of about 100-$\mu$m$^2$.

While Specification II describes a degree of coplanarity of the upper reaches that we feel comfortably affords a low-wear interface, we realize that such surfaces having uppermost asperities which are coplanar to within about 2-nm are advantageous, and that those which are coplanar to within about 0.75-nm are preferable.

Figure 10:
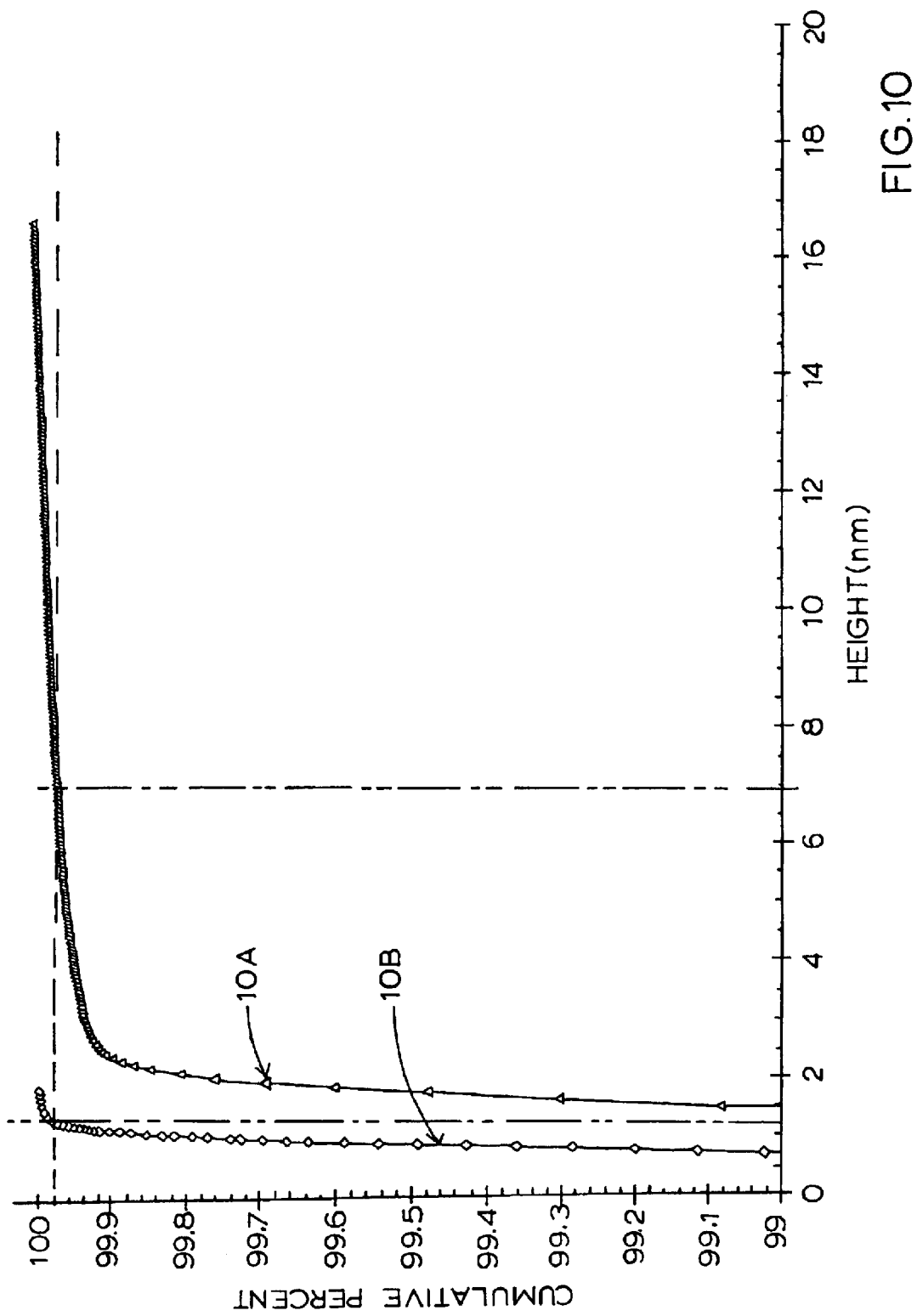
FIG. 10 pictures portions of two bearing area curves plotting cumulative percentage of area vs. height (relative to a defined datum plane) for two surfaces such as the ones shown in FIGS. 4 and 5 and cross-sectioned in FIG. 8.

Turning attention now to FIGS. 10 and 11, and beginning with FIG. 10, here there are shown portions of two bearing area curves 10A and 10B which illustrate data relating to the surfaces pictured in FIGS. 4 and 5, respectively, from which data, application of and conformance with Specification II can be determined. These curves plot, against the upper 1% of the cumulative area of the examined surface, the height in nm (relative to a predetermined datum plane) of asperities contributing to make up that curve. Reading generally the information furnished by curve 10A, one can see that the precursor, unbuffed, not yet process-graded surface pictured in FIG. 4, which is typical for an untexturized disk surface prepared in accordance with this invention up to final buffing, contains a surface topography wherein the separation between the two planes identified above in the descriptor for Specification II is about 5.3-nm. In FIG. 10, the plane separating the highest 0.02% of surface is represented by the horizontal dashed line, and the plane separating the highest 1.0% of the surface is represented by the horizontal axis which is coincident with the 99.0-cumulative-area-percentage-figure. The plane separation just mentioned is measured (along the horizontal axis) between the point of intersection of curve 10A with the horizontal axis, and the vertical dash-double-dot line (appearing near the right side of FIG. 10) which indicates the point of intersection of the curve with the dashed line.

Curve 10B, which relates to the final, buffed surface pictured in FIG. 5 (also typical for such a buffed nontexturized surface prepared in accordance with the teachings of this invention), is characterized by a separation of these same two planes of about 0.4-nm—a plane separation which indicates clear conformity of this surface with Specification II. This plane separation is measured between the point of intersection of curve 10B with the horizontal axis, and the vertical dash-double-dot line (appearing near the left side of FIG. 10) which indicates the point of intersection of this curve with the dashed line.

Taking a look now at FIG. 11, here, as in FIG. 10, there are shown portions of two bearing area curves, designated 11A and 11B, which two curves are derived from data relating to the surfaces pictured in FIGS. 6, 7, respectively—the texturized surface. In the precursor (yet unbuffed) not yet process-upgraded surface pictured in FIG. 6, the separation between the two Specification II planes of interest is about 4.4-nm, and in the final, buffed, process-graded surface pictured in FIG. 7 (curve 11B), this plane separation has been reduced to about 1.5-nm—in conformity with Specification II. These plane separation measurements as pictured in FIG. 11 are determined by the same kinds of "curve intersections" discussion in relation to FIG. 10.

Specification III

Specification III is met by a surface having, over an area of about 100-$\mu$m$^2$, an equivalent root-mean-squared (RMS) roughness, for lateral wavelengths between 100-nm/cycle and 40-nm/cycle, of less than 0.04-nm, for that portion of the surface which is between the 99.00% height level and the 99.99% height level.

While Specification III has been limited to such equivalent RMS roughness less than 0.04-nm, surfaces having equivalent RMS roughnesses less than about 0.05-nm are advantageous, and that those having equivalent RMS roughnesses less than about 0.02-nm are preferable.

As an aid to an explanation of this Specification, let us take a brief look now at FIG. 12. As was mentioned earlier, FIG. 12 is a power spectrum—a figure plotting power vs. lateral wavelength in $\mu$m/cycle—which spectrum illustrates a surface meeting Specification III. The wavelength portion of this spectrum that is relevant to this Specification lies between the two cursors shown at 62, 64. Cursor 62 marks the 0.1-$\mu$m/cycle (100-nm/cycle) position along the horizontal scale, and cursor 64 marks the 0.04-$\mu$m/cycle (40-nm/cycle) position therealong. Cursor 64 lies just above the shortest lateral wavelength sampled in the data. The power spectrum illustrated in FIG. 12 is derived from data relating to the final buffed surface pictured in FIG. 5. The equivalent RMS roughness calculated from this data, for the wavelength portion of the spectrum bounded by cursors 62, 64, is 0.01-nm—a value which is clear conformity with Specification III.

In addition to the various disk-surface topographic characteristics mentioned, the interface of the present invention is further characterized by the presence of a deposited film of lubricant composed primarily of a substance including a substantial molar fraction of at least one of fluorocarbons and hydrocarbons, such, preferably, as a perfluoropolyether lubricant, having a thickness preferably no less than about 1-nm, and preferably within the range of about 1- to about 2.5-nm, as measured by a technique selected from the group (described immediately hereinbelow) consisting of Technique I, Technique II and Technique III, and by the presence of at least one read/write, pole-structure-bearing contact pad (or instrumentality) in contact with the lubricated surface of the disk.

Lubricants which have been used with success in the practice of this invention include, for example, Z-Dol 2000 and Z-Dol 4000—products made by Ausimont of Morristown, N.J. Lubricants of the hydrocarbon family include, for example, X-1P phosphazene, made by Dow Chemical Company of Midland, Mich.

Technique I employs Electron Spectroscopy for Chemical Analysis (ESCA), which is also known as X-ray Photoelectron Spectroscopy (XPS). Technique II takes the form of Fourier Transform Infrared Spectroscopy (FTIS). Technique III involves Ellipsometry. These are well known procedures.

Thus having now described the various structural (surface-topographical and other) features of the interface, system and rigid medium of the present invention, it may be useful at this point in the description, and before delving into the process and methodology aspects of the invention, to take what can be thought of as a gathering, collective view of the proposed system, medium and contact/communication interface.

So gathering and viewing the collective cooperate whole of what has been described so far, one sees herein the presentation of a magnetic information storage and retrieval system in which read/write pole structure is adjustably positioned, under servoactuator control, and via the agency of an elongate contact-biasing and supporting slender flexure, into shiftable, contacting, substantially continuous engagement with the lubricated surface in a rigid magnetic recording medium. The medium is moved, under drive-motor control, to create, during motion operation, a continuously existing, infinitely-ever-changing zone of relative-motion, interfacial-signal-producing-rubbing communication between contact structure which embeddedly contains the pole structure and the medium's recording surface. This zone of relative motion defines a communication via wherein, during reading and writing operations, there exists an electromagnetic communication signal condition which operates in a vicinity that is immediately adjacent the region of dynamic interfacial contact. The existing contact interface is one wherein the outermost portion of the recording medium's surface comprises a rigid-material landscape which has been process-graded (i.e. hereinsofar) to a final state in the medium, relative to a pre-final state therein, (1) to diminish, relative to a pre-selected, nominal, base datum plane in the medium, which plane separates the highest 1.0% of the total area of the recording surface from the lowest 99.0% of that area, the peak heights of asperities (protrusions) extending above that plane, and (2) to increase the average radius of curvature of post-process-graded asperities which extend above that datum plane relative to the average radius of curvature of pre-process-graded asperities which previously extended above that datum plane. The radii of curvature averages are based upon the radii of asperities as measured in a plane which is generally normal to the mentioned base datum plane.

Before launching into a discussion of methodology and processing, let us for a moment, at this point, revisit the notion and concept of providing what was referred to earlier, in relation to a discussion of FIG. 3 in the drawings, as a dual-surface-characteristic disk surface. Such a surface might have, for example, the kind of organizational layout generally depicted in FIG. 3, wherein the surface includes a recording-surface zone, such as zone or area 34, and a parking-surface zone, such as zone 39, located on the ID side of the recording-surface zone. Given the purpose for which a parking-surface zone might be provided (expressed earlier), it will be apparent that such a zone need only have a relatively narrow width (radial dimension in the case of a disk) selected to be appropriate for receiving the "parked" disk-contacting structure during periods of nonoperation.

We have determined that a successful dual-surface-characteristic disk surface might well be formed with the recording-surface zone having a texturized surface characteristic such as is pictured in FIG. 7, and with the parking-surface zone having a nontexturized surface characteristic such as is pictured in FIG. 5. One will note that while such two zones, if so prepared and presented, would be distinguished by the issue of texturization, the uppermost reaches of the total surface areas within these zones, i.e. within the upper 1.0% of the respective total surface areas of the zones, would be characterized by like microtopographical features, and specifically, by features meeting one or more of Specifications I, II or III.

Turning attention now to a preferred process of preparing a contact interface in accordance with the teachings of the present invention, and with specific focus initially on the preparation of a nontexturized surface, and from a general and entire overview of the whole process, the same includes, beginning (as an illustration) with an aluminum substrate blank of the desired size (and reference herein will be made to a 48-mm diameter disk): (1) plating each side of the disk (in a conventional fashion) to create a NiFe underlayer with a thickness of about 10- to about 11-$\mu$m (alternatively, NiP may be plated or a glass substrate may be used without plating); (2) polishing each such plated surface in a novel two-step polishing procedure proposed by the invention; (3) washing the polished surfaces; (4) sputtering thereonto the appropriate recording layer(s); (5) overcoating these layers with carbon (or other selected overcoating material); (6) kiss-buffing and thereby smoothing the carbon (or other) overcoats to have a final thickness greater than about 8-nm; (7) washing the kiss-buffed surfaces to obviate any later surface-debris-induced performance problems; (8) lubricating the washed surfaces in accordance with the teachings of the invention; (9) wiping the lubricated surfaces; and (10) conducting an appropriate glide-height test, still-to-be mentioned.

Within this overall surface-preparation procedure, there are certain steps which already form part of the known state-of-the-art, as well as several very innovative steps and procedures which are contributed by the present invention. It is now with respect to the latter category of steps that elaboration of the surface-preparation process continues in this descriptive specification.

Beginning with an explanation of the novel two-step (stage) polishing process proposed by the invention, a process especially related to the preparation of nontexturized surface, this process starts with a rough-polishing stage which effects planarization and homogenization (inner diameter to outer diameter) of the surface roughness during which various surface features, such as asperities, nodules, micro-plating pits, etc., are removed. The rough-polishing stage is performed utilizing, for example, a commercially available, double-sided polishing machine, such as a Speedfam 9B machine made by Speedfam Corporation, and is conducted in three time-seriatim phases, with different respective polishing pressures employed in these three phases. The first phase lasts for about 1-min and is performed with a polishing pressure of about 59-g/cm$^2$, the second phase for about 14- to about 16-min with a polishing pressure of about 100-g/cm , and the third phase for about 1-min with (again) a polishing pressure about 59-g/cm$^2$. An appropriate polishing slurry is 2:1 diluted acidic-base alumina polishing slurry with an average particle size of about 0.8-$\mu$m. The first polishing step employs a polishing pad which is effective for planarization with a fast material-removal rate (typical hardness 45–47 in Shore D, typical specific gravity 0.4–0.55-g/cm$^3$). For example, a Rodel MH N24a type pad satisfies the pad requirement for this first polishing step.

This three-phase, first-rough-stage polishing protocol is followed by a deionized (DI) water rinse for a period of about 2-min and with a water flow rate of about 2.75-l/min.

With the unpolished nickel-iron underlayer beginning as has been mentioned with a thickness in the range of about 10- to about 11-μm, after the rough-polishing stage the thickness of this layer is reduced to about 7.5-μm, with the layer having an average RMS roughness less than about 0.65-nm, and a peak-to-valley separation of less than about 8-nm as determined by optical profilometry (an RMS roughness less than about 2.0-nm, and a pack-to-valley separation of about 20-nm as determined by AFM). Under high-intensity light, the surface will display no visual scratches.

The second and final, fine-polishing stage is also performed in three time-seriatim phases employing a somewhat thicker and softer polishing pad, such as a Rodel Supreme DG Hi type pad, with the first polishing phase lasting about 1-min and performed with a polishing pressure of about 29-g/cm$^2$, the second lasting about 5- to about 8-min and performed with a polishing pressure of about 71-g/cm$^2$, and the third lasting about 3- to about 5-min and performed, as initially, with a polishing pressure of about 29-g/cm$^2$. The polishing slurry for this stage is finer than that used for the first stage, and preferably is 3:1 diluted Fujimi RDD2452 for 22% Fe content.

On completion of this second, fine-polishing stage, the underlayer will typically have a thickness of about 7.5-μm, an average RMS roughness typically less than about 0.17-nm, and a peak-to-valley separation of typically less than about 2.0-nm as determined by optical profilometry (an RMS roughness less than about 0.35-nm and a peak-to-valley separation typically less than about 4.0-nm as determined by AFM).

Following the second, fine-polishing stage, disks which have been polished are washed with a DI water rinse for a time period of about 30- to about 60-sec and with a water flow rate of up to about 2.0-l/min. Preferred rinse time is about 45-sec and preferred flow rate is about 1.75-l/min.

After completion of the second and final polishing stage, including the DI water rinsing step, there then follows a two-stage washing procedure. This procedure is performed using Oliver Design Equipment.

Utilizing as a washing detergent Oakite NST detergent, concentration 1% (0.19-liter Oakite+18.81-liters DI water), the stage one process is performed in three time-seriatim phases including a soaping phase which lasts for about 3-sec, a scrub-phase which lasts for about 20-sec, and a rinse-phase which lasts for 36-sec. Washing is performed employing a laminated Rodel 204 type pad. The second stage is also a three-phase time-seriatim process including a soaping phase which lasts for about 3-sec, a scrub-phase which lasts for about 15-sec, and a rinse-phase which lasts for about 40-sec. Washing is performed employing Oakite NST detergent, concentration 0.1% (0.019-liter Oakite+ 18.981-liters DI water), applied again employing a Rodel 204 type pad. This two-stage washing procedure concludes with a final DI water rinse which lasts for about 15-sec.

The washed disks are subsequently rinsed and dried in three individual steps using equipment manufactured by Semitool. In the first step, each disk is rinsed with DI water for about 3-min while spinning at about 40-rpm. Thereafter, spin speed is increased to about 2800-rpm for what we refer to as high-speed spin-off drying. During the second step, each disk is dried with flowing nitrogen gas for a period of about 4-min at 2800-rpm. In the third step, spin speed is reduced to about 600-rpm, and held at this speed, still within the flow of nitrogen gas, for a period of about 2-min.

Following this procedure, each disk is appropriately subjected to conventional sputtering in order to create the required magnetic storage layer(s). Thereafter, each disk surface receives a sputtered overcoat of, for example, hydrogenated or nonhydrogenated carbon, nitrogenated or nonnitrogenated carbon, or silica. The magnetic recording layer thus created typically has a thickness of about 95-nm, and the overcoat a thickness of about 10-mn.

The recording surface of the disk at this point in the process has a topography substantially corresponding to the surfaces depicted in FIGS. 4 and 8 (upper trace)—a pre-process-graded condition for the surface.

The next process protocol now to be detailed which forms an important contribution in the methodology of the present invention, is the process which we refer to as kiss-buffing (and also as buffing, smoothing, and process-grading). To perform our unique kiss-buffing procedure, we employ (quite unconventionally) a conventional machine made by Exclusive Design Company Inc. (EDC), selected from its family of Hard Disk Finishers. In particular, we have employed successfully the EDC Series 800 HDF, Model C machine.

Using this machine, each disk is mounted, via gripping at its open ID, onto the end of a power-driven rotary spindle in the machine, with the disk positioned to spin between, and within the nip (or pinch) region of, a pair of opposing rubber rolls, around each of which is trained an abrasive tape that moves over the rolls during the procedure with the rolls moved toward one another and into high-pressure pinching engagement with the opposite sides of the spinning disk.

FIGS. 13A, 13B and 13C in the drawings, in a very simple fashion, schematically illustrate this organization and operation. Referring first to FIGS. 13A and 13C, a disk to be kiss-buffed is clamp-mounted at its ID onto the right end (in these figures) of a spindle 66 which forms part of the machine. During kiss-buffing, spindle 66 rotates on axis 67 at about 1800-rpm. Shown at 68, 70 are two BUNA-N rubber idler rolls, each having a hardness of 50-Durameter, a diameter of about 25-mm, and an axial dimension of about 17.5-mm. Trained around rolls 68, 70, which are suitably mounted for rotation on axes 69, 71, respectively, and extending therefrom to appropriate pay-out and take-up spools (not shown), are two elongate strips of abrasive tape 72, 74, each of which has a width about matching the axial dimension of the rolls, and each being a Mipox (the manufacturer) SFEY-A-0.5-μm particle-size tape.

During a kiss-buffing procedure, and with the disk spinning at the rpm mentioned above, rolls 68, 70 are turned, in the counter-rotative directions indicated by the curved arrows in FIG. 13C, with a speed sufficient to move the two tapes, in the counter-directions indicated by arrows 76, 78, at a linear speed of about 350-mm/min. During kiss-buffing, the rolls and their respective supported tapes are driven, as indicated by arrows 80, 82, against opposite sides of disk 10. The tapes are pressed against the disk, under a load within the range of about 454- to about 680-grams, and preferably of about 545-grams, for a period of time within the range of about 5- to about 90-sec, and most preferably for about 60-sec. Under these circumstances, the regions of tape/disk contact each takes the form of a slender, rectilinear footprint, such as that (not drawn to scale) indicated in dash-dot lines at 83 in FIG. 13B, wherein there exists a pressure preferably of about 24.5-g/mm$^2$. This footprint, on each side of the spinning disk, preferably has a narrow dimension of about 1.27-mm and a long dimension of about 17.5-mm.

On the average, kiss-buffing removes a depth of overcoat material in the range of about 1.4- to preferably less than about 2.0-nm.

While the kiss-buffing process described above appears to be a critical and necessary step for the purpose of achieving the specified upper-surface topography, we anticipate that alternative smoothing, process-grading processes may be successfully used, such as electro-polishing or burnishing.

Following kiss-buffing, and according to yet another important feature of our invention, each disk is cleaned (washed), beginning with, typically, a 12-min cycle in a megasonic cleaner operating at 760-KHz, and employing 0.1% Oakite NST detergent, followed by a soak/air-dry cycle lasting about 1-min starting in a hot water tank beginning with DI water at a temperature of around 130°-F.

At this point in the process, the disk surface has a topography substantially corresponding to FIGS. 5 and 8 (lower trace)—a post-process-graded condition for the surface.

Lubricant, such as Z-Dol 2000, is then applied to each surface of a dried disk by immersing the disk in a small tank containing 0.1% Z-Dol 2000 (in Freon) and allowing it to equilibrate therein for about 1-min. The solution is then drained at 0.167-mm/min. Thereafter, the applied lubricant is wiped to create a final lubricant thickness no less than about 1-nm, and preferably in the range of about 1- to about 2.5-nm. Wiping is performed again utilizing an EDC Model 800 machine of the type generally described earlier, substituting for the earlier-used abrasive tape Thomas West Cotton Wipes WW1 type tape operated against the opposite sides of a disk at a linear speed of about 100-mm/min, and under the same load mentioned earlier, for a period of about 45-sec and with the disk spinning at about 1800-rpm.

At the conclusion of all these steps in the process of preparing the disk surface, a standard glide-height test is performed to establish that each finished disk passes successfully glide height over the entire surface of less than about 40-nm using a 50% slider.

Describing now two other preferred manners of practicing the methodology of the present invention, and focussing attention on the preparation of a disk having a texturized surface, one approach, which can be thought of as a "from the ground up" approach, involves preparing a disk, using entirely well-known, conventional state-of-the-art techniques up through and including the stage of carbon (or other) overcoating, and thereafter applying precisely those steps which have just been described above beginning with kiss-buffing and ending with washing, lubricating, wiping, and glide-height testing.

Another approach, which might be thought of as a "retroprocessing" approach, involves the processing of any one of many otherwise commercially-available (texturized or nontexturized) disks in the following fashion. Beginning with such a commercially available texturized disk, which will, in today's world, be a lubricated disk, the "retroprocessing" procedure begins with the step of delubricating the disk. Using a pick, such a disk is lowered into an appropriate delubricating solution and submerged for about 1-min. During that time, the disk is gently swirled within the solution, and thereafter is slowly withdrawn and allowed to air dry.

Following drying, the disk is immersed in a megasonic cleaning tank filled with 0.1% Oakite NST/DI water solution wherein it is cleaned for a period of about 12-min. Following this cleaning step the disk is soaked in a tank of hot DI water (about 130° F.) for about 1-min. Following soaking, the disk is slowly withdrawn from the tank and again allowed to air dry for a period of about 30-min.

At this point in the process, and assuming that retroprocessing is being performed on a texturized disk, the recording surface has a topography substantially corresponding to those of the surfaces depicted in FIGS. 6 and 9 (upper trace)—a pre-process-graded condition for the surface.

From this point on, the disk is subjected to all of the steps, beginning with kiss-buffing, precisely as described earlier hereinabove.

Figure 14:
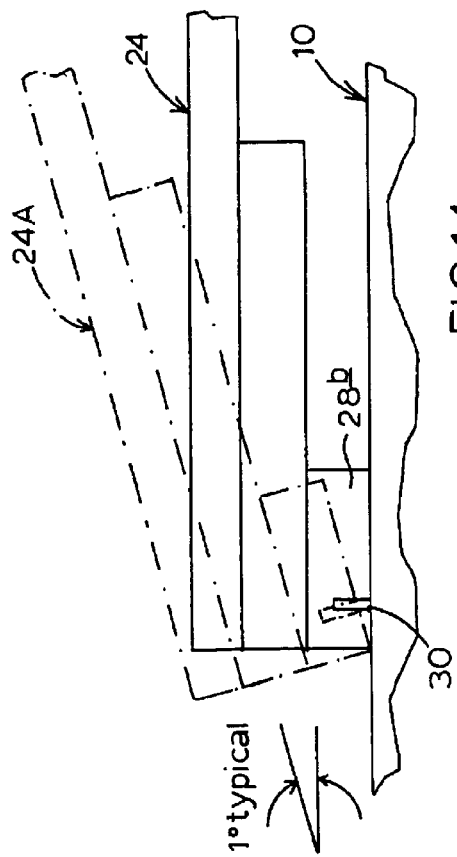
FIG. 14 illustrates two different points in time of a "tilt protocol" wear-testing procedure.
Figure 15:
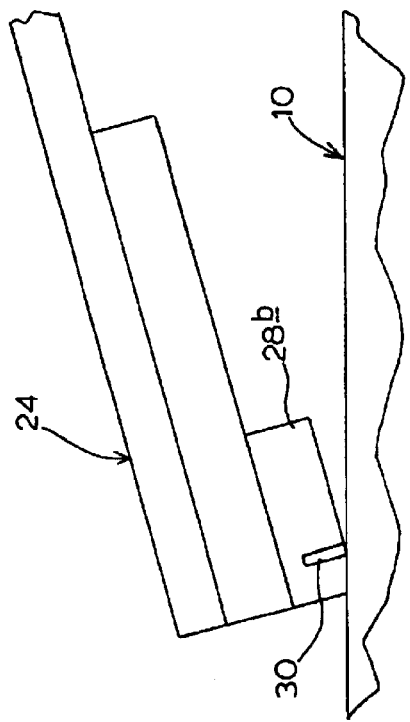
FIG. 15 shows a later point in time of the same "tilt protocol" procedure.

Moving now beyond a discussion of processing, as was stated earlier, FIGS. 14 and 15, to which we now direct attention, illustrate the tilt-protocol wear test which has already been mentioned, and specifically show, with some scale exaggeration, three points in time during that wear test.

Looking first at FIG. 14, in solid outline, head/flexure/conductor structure 24 is shown in a condition with wear pad 28b (which has been lapped) and pole structure 30 in flush (idealized) contact with the upper recording surface of disk 10. Data which have been previously written onto the upper recording surface of disk 10 are then read, and this data produces the maximum-amplitude output signal from the transducer (in structure 24) which can be expected in the system being illustrated. Linking attention here to FIG. 16 (which spans a 24-hour time period), this maximum output signal is indicated in the graph of FIG. 16 at 84.

The next thing to occur is that head/flexure/conductor structure 24 is tilted as is indicated in dash-dot lines at 24A in FIG. 14, typically at an angle of about 1° (exaggerated in the drawing) onto the sharp lower left-hand corner of wear pad 28b as such is pictured in FIG. 14. When this occurs, the output signal amplitude from the transducer drops dramatically, and this is indicated by the portion of the graph pictured in FIG. 16 at 86.

With structure 24 maintained in the tilted condition just described, material begins to wear away from the left-hand edge of pad 28b, and as this occurs, pole structure 30 reapproaches a condition of contact with the recording surface in disk 10, with the rate of reapproach being determined by the wear rate occurring in the region of contact between the wear pad and the disk. FIG. 16, in the curve portion indicated at 88, indicates a very low wear rate, and thus a very slow return of transducer output signal from quite low to maximum which is characteristic of the interface offered by the present invention. The graph curve in FIG. 16 shown at 90 is presented in order to contrast the extremely low wear rate indicated by graph portion 88 to a very high and unacceptable wear rate.

Figure 16:
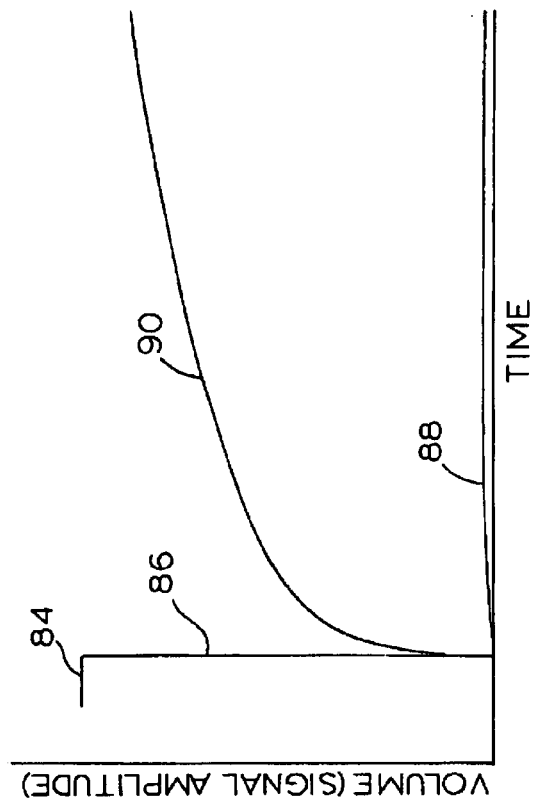
FIG. 16 is a graph which illustrates, and is interpretable to indicate, wear rate and wear volume vs. time in the interface of the present invention (for the tilt-protocol test), and to compare the same with the greater wear rate which would occur in the absence of the presence of an interface constructed in accordance with this invention.

Data derived from a curve like that pictured in FIG. 16, having applied to it the appropriate amplitude/separation loss equation(s), is interpretable to predict usable interface life.

This, then, concludes our detailed description of the structural and methodological features of the contact interface, system and rigid medium territories of the present invention. Reiterating what was said early in this document, practice of the invention which we have just described offers, to the important and emerging art of contact recording on a rigid medium, a remarkable advance in the area of minimizing contact wear. Fundamentally, the significant advances made available by the present invention rest both on the recognition that one's focus, in such a wear regime, need only be directed to the very uppermost topographical regions of a rigid medium's surface, and upon the careful and thoughtful discovering of what kind of upper-level surface topographical characteristics must necessarily be achieved in order to create, and to have, an interface possessing the exceptionally low wear rate achievable by the interface of the present invention.

Accordingly, it should be apparent to readers of this document that a novel contact interface, system and rigid medium, and a methodology for creating the same, are offered by the teachings of the present invention, and have been clearly expressed and demonstrated by the contents of the present disclosure.

And, while preferred and alternative embodiments of the invention have been discussed herein, it is appreciated that variations and modifications thereto may become apparent to those skilled in the art, and may be made without departing from the spirit of the invention.

We desire to claim and secure by Letters Patent:

1. A contact interface in an electromagnetic information storage media environment comprising a rigid information storage medium having a surface associated with an information storage layer, said surface having asperities disposed within a 100-$\mu m^2$ area and having tops, in a highest 1.0% of said area excepting the uppermost 0.01%, with an average radius of curvature of at least about 2-$\mu$m, and at least one structure bearing a transducer means for communicating with said layer during contact with said surface.

2. The interface of claim 1, wherein said structure includes a contact pad, and said transducer includes a pole structure embedded within said pad.

3. The interface of claim 1 which further includes a film of lubricant distributed on said surface.

4. The interface of claim 3, wherein said lubricant is composed primarily of a substance including a substantial molar fraction of at least one of fluorocarbons and hydrocarbons.

5. The interface of claim 1, wherein said medium is a disk.

6. The interface of claim 1, wherein said medium is a disk, and said surface includes a substantial molar fraction of carbon.

7. The interface of claim 1, wherein said medium is a disk, and said surface includes a substantial molar fraction of one of silica or alumina.

8. A communication interface in an information storage and retrieval system comprising a rigid information-storage medium having a surface with an associated information-storage layer, said surface having a plurality of protrusions disposed within a 100-$\mu m^2$ area and having tops, in a highest 1.0% of said area excepting the uppermost 0.01%, with an average radius of curvature of at least about 2-$\mu$m, and a structure bearing a transducer having means for information storage and retrieval communication with said layer during dynamic contact between said structure and said surface.

9. The interface of claim 8 which further includes a film of lubricant distributed on said surface.

10. The interface of claim 8, wherein said protrusions are curvilinear ridges which are separated by grooves.

11. An information storage and retrieval system comprising a rigid electromagnetic recording medium having a recording surface, an elongate flexure extending adjacent to said surface, an electromagnetic transducer joined to said flexure and having a medium-facing pad and pole structure in dynamic contact with said surface, wherein a portion of said surface contacts said pad and pole structure with a plurality of asperities having tops with an average radius of curvature greater than about 1.5-$\mu$m.

12. The system of claim 11 which further includes a film of lubricant distributed on said surface.

13. A communication interface in a disk drive system comprising a rigid magnetic recording disk having a surface with an associated magnetic recording layer, said surface having smoothed asperities disposed within a 100-$\mu m^2$ area with tops in the highest 1.0% of said area having an average radius of curvature of at least about 2-$\mu$m.

a lubricant disposed on said surface, a read/write pole-structure-bearing contact instrumentality in dynamic contact with said lubricated surface, and an electromagnetic communication signal condition extant between said magnetic layer and said pole structure via said area amid dynamic contact between said surface and said instrumentality.

14. A magnetic information storage and retrieval system which employs substantially continuous sliding contact between a recording surface in a rigid magnetic recording medium and a contact instrumentality which contains read/write pole structure, and which features, during operation, a relative-motion contact zone defining an electromagnetic signal-communication via between said surface and said pole structure, wherein microscopic, contact-interactive topographic characteristics in the upper reaches of said surface, shaped as rounded-top asperities having a radius-of-curvature no less than about 2-$\mu$m.

* * * * *